(12) United States Patent
Beh et al.

(10) Patent No.: US 11,648,506 B2
(45) Date of Patent: *May 16, 2023

(54) ELECTROCHEMICAL DESALINATION SYSTEM

(71) Applicant: Palo Alto Research Center Incorporated, Palo Alto, CA (US)

(72) Inventors: Eugene S. Beh, Portola Valley, CA (US); Jessica Louis Baker Rivest, Palo Alto, CA (US); Michael Benedict, Palo Alto, CA (US); Elif Karatay, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/200,309

(22) Filed: Nov. 26, 2018

(65) Prior Publication Data

US 2019/0240614 A1 Aug. 8, 2019

Related U.S. Application Data

(60) Provisional application No. 62/628,573, filed on Feb. 9, 2018, provisional application No. 62/627,449, filed on Feb. 7, 2018.

(51) Int. Cl.
*B01D 53/14* (2006.01)
*H01M 8/22* (2006.01)
(Continued)

(52) U.S. Cl.
CPC ....... *B01D 53/1425* (2013.01); *B01D 53/263* (2013.01); *B01D 61/422* (2013.01);
(Continued)

(58) Field of Classification Search
CPC ...... B01D 61/422; B01D 61/44; B01D 61/46; C02F 1/4693
See application file for complete search history.

(56) References Cited

U.S. PATENT DOCUMENTS

| | | | |
|---|---|---|---|
| 2,672,024 | A | 3/1954 | Mcgrath |
| 4,118,299 | A | 10/1978 | Maget |

(Continued)

FOREIGN PATENT DOCUMENTS

| | | |
|---|---|---|
| CN | 206055832 | 3/2017 |
| CN | 108187459 | 6/2018 |

(Continued)

OTHER PUBLICATIONS

Li et al, "Photovoltaic-Electrodialysis Regeneration Method for Liquid Desiccant Cooling System," Solar Energy 83 (2009) 2195-2204 (Year: 2009).*

(Continued)

*Primary Examiner* — Salil Jain
(74) *Attorney, Agent, or Firm* — Mueting Raasch Group

(57) ABSTRACT

A system comprises an electrodialysis apparatus, which includes first and second reservoirs, wherein a salt concentration in the first reservoir reduces below a threshold concentration and salt concentration in the second reservoir increases during an operation mode. A first electrode comprises a first solution of a first redox-active electrolyte material, and a second electrode comprises a second solution of a second redox-active electrolyte material. In a first reversible redox reaction between the first electrode and first electrolyte material at least one ion is accepted from the first reservoir, and in a second reversible redox reaction between the second electrode and second electrolyte material at least one ion is driven into the second reservoir. A first type of membrane is disposed between the first and second reservoirs, and a second type of membrane, different from the
(Continued)

first type, is disposed between the respective electrodes and reservoirs.

7 Claims, 26 Drawing Sheets

(51) Int. Cl.
| | |
|---|---|
| B01D 61/46 | (2006.01) |
| B01D 53/26 | (2006.01) |
| H01M 8/18 | (2006.01) |
| B01D 61/42 | (2006.01) |
| B01D 61/44 | (2006.01) |
| C02F 1/469 | (2023.01) |
| C02F 103/08 | (2006.01) |

(52) U.S. Cl.
CPC ............. *B01D 61/44* (2013.01); *B01D 61/46* (2013.01); *C02F 1/4693* (2013.01); *H01M 8/188* (2013.01); *H01M 8/227* (2013.01); *B01D 2313/28* (2013.01); *B01D 2313/30* (2013.01); *B01D 2313/345* (2013.01); *B01D 2313/36* (2013.01); *B01D 2313/50* (2013.01); *C02F 2103/08* (2013.01); *C02F 2303/10* (2013.01); *H01M 2250/10* (2013.01)

(56) References Cited

U.S. PATENT DOCUMENTS

| | | | |
|---|---|---|---|
| 4,593,534 | A | 6/1986 | Bloomfield |
| 4,984,434 | A | 1/1991 | Peterson et al. |
| 6,159,352 | A | 12/2000 | Riera et al. |
| 6,187,201 | B1 * | 2/2001 | Abe ..................... B01D 61/58 204/529 |
| 6,719,891 | B2 | 4/2004 | Ruhr et al. |
| 7,083,730 | B2 | 8/2006 | Davis |
| 7,974,076 | B2 | 7/2011 | Xiong et al. |
| 7,992,855 | B2 | 8/2011 | Awano |
| 8,545,692 | B2 | 10/2013 | James et al. |
| 8,769,972 | B2 | 7/2014 | Bahar |
| 8,801,910 | B2 | 8/2014 | Bazant et al. |
| 8,999,132 | B2 | 4/2015 | Bazant et al. |
| 9,112,217 | B2 | 8/2015 | Kim et al. |
| 9,340,436 | B2 | 5/2016 | Sahu et al. |
| 9,546,426 | B2 | 1/2017 | Logan et al. |
| 9,548,620 | B2 | 1/2017 | Hu et al. |
| 9,640,826 | B2 | 5/2017 | Yan et al. |
| 9,670,077 | B2 | 6/2017 | Volkel et al. |
| 9,673,472 | B2 | 6/2017 | Volkel et al. |
| 9,905,876 | B2 * | 2/2018 | Schubert ............ H01M 8/0289 |
| 10,124,296 | B2 | 11/2018 | Pozzo et al. |
| 10,525,417 | B2 | 1/2020 | Newbloom et al. |
| 10,550,014 | B2 | 2/2020 | Desai et al. |
| 10,821,395 | B2 * | 11/2020 | Beh .................... B01D 53/1425 |
| 10,822,254 | B2 | 11/2020 | Desai et al. |
| 11,015,875 | B2 | 5/2021 | Benedict et al. |
| 11,020,713 | B2 | 6/2021 | Demeter et al. |
| 11,117,090 | B2 | 9/2021 | Benedict et al. |
| 11,149,970 | B2 | 10/2021 | Bahar et al. |
| 11,185,823 | B2 | 11/2021 | Beh et al. |
| 2005/0183956 | A1 * | 8/2005 | Katefidis ................ B01D 61/52 204/520 |
| 2006/0141346 | A1 | 6/2006 | Gordon et al. |
| 2007/0215474 | A1 * | 9/2007 | Batchelder ............ B01D 61/46 204/524 |
| 2015/0048777 | A1 * | 2/2015 | Goldstein ............ H02J 7/0042 320/101 |
| 2015/0232348 | A1 | 8/2015 | Jepson |
| 2018/0191012 | A1 * | 7/2018 | Zhang .................. H01M 8/188 |
| 2020/0070094 | A1 * | 3/2020 | Hussaini ............. C02F 1/46109 |
| 2021/0370228 | A1 | 12/2021 | Benedict et al. |

FOREIGN PATENT DOCUMENTS

| | | | |
|---|---|---|---|
| EP | 3336064 | | 6/2018 |
| JP | 04018919 A | * | 1/1992 ............. B01D 61/44 |
| KR | 20130106530 A | * | 9/2013 |
| KR | 20150034545 | | 4/2015 |
| WO | 2014/181898 | | 11/2014 |
| WO | 20150143332 | | 9/2015 |
| WO | 2018/032003 | | 2/2018 |
| WO | 2018/119280 | | 6/2018 |
| WO | 20180191806 | | 10/2018 |

OTHER PUBLICATIONS

Al-Karaghouli et al., "Energy consumption and water production cost of conventional and renewable-energy-powered desalination processes", Renewable and Sustainable Energy Reviews 2013, 24, 343-356.

Anderson et al., Capacitive deionization as an electrochemical means of saving energy and delivering clean water. Comparison to present desalination practices: Will it compete?:, Electrochimica Acta 2010, 55 (12), 3845-3856.

Arellano et al., "Effects of pH on the degradation of aqueous ferricyanide by photolysis and photocatalysis under solar radiation", Solar Energy Materials and Solar Cells 2010, 94 (2), 327-332.

ASHRAE Standard, "Method of Testing for Rating Desiccant Dehumidifiers Utilizing Heat for the Regeneration Process", 2007.

Beh et al., "A Neutral pH Aqueous Organic-Organometallic Redox Flow Battery with Extremely High Capacity Retention" ACS Energy Lett, 2017, 2, pp. 639-644.

Desai et al., "Electrochemical Desalination of Seawater and Hypersaline Brines with Coupled Electricity Storage", ACS Energy Lett 3, 2, 2018, pp. 375-379.

Desalination Experts Group, "Desalination in the GCC", 2014, 47 pages.

Dipaola, "Saudi Arabia Gets Cheapest Bids for Solar Power in Auction" Bloomberg, Jan. 16, 2018, 3 pages.

Gong et al., All-Soluble All-Iron Aqueous Redox-Flow Battery, ACS Energy Letters, 2016, 1, pp. 89-93.

Gong et al., "A zinc-iron redox-flow battery under $100 per kW h of system capital cost", Energy & Environmental Science, 2015. 5 pages.

Hilbert et al., "Correlations between the Kinetics of Electrolytic Dissolution and Deposition of Iron: I. The Anodic Dissolution of Iron", Journal of The Electrochemical Society 1971, 118 (12), 1919-1926.

Howell et al., "Overview of the DOE VTO Advanced Battery R&D Program", Jun. 6, 2016 24 pages.

Hu et al, "Long-Cycling Aqueous Organic Redox Flow Battery (AORFB) toward Sustainable and Safe Energy Storage", Journal of the American Chemical Society 2017, 139 (3), 1207-1214.

Khawaji et al., "Advances in seawater desalination technologies", Desalination 2008, 221 (1-3), 47-69.

Ozubal et al., "Low-Flow Liquid Desiccant Air-Conditioning: Demonstrated Performance and Cost Implications" NREL Technical Report, Sep. 2014, 104 pages.

"Lazard's Levelized Cost of Storage—Version 2.0." 2016, 46 pages.

Lee et al., "Desalination of a thermal power plant wastewater by membrane capacitive deionization", Desalination 196, 2006, pp. 125-134.

Logan et al, "Membrane-based processes for sustainable power generation using water", Nature 2012, 488, 313.

Malhotra et al., "Use cases for stationary battery technologies: A review of the literature and existing projects", Renewable and Sustainable Energy Reviews 56, 2016, pp. 705-721.

McGovern et al., "On the cost of electrodialysis for the desalination of high salinity feeds", Applied Energy 136, Dec. 2014, pp. 649-661.

Moore et al., "Evaporation from Brine Solutions Under Controlled Laboratory Conditions; Report 77 for the Texas Water Development Board", May 1968, 77 pages.

(56) References Cited

OTHER PUBLICATIONS

Oren, "Capacitive deionization (CDI) for desalination and water treatment—past, present and future (a review)", Desalination 2008, 228 (1-3), 10-29.
Sata, "Application of Ion Exchange Membranes. In Ion Exchange Membranes: Preparation, Characterization, Modification and Application", The Royal Society of Chemistry: Cambridge, 2004.
Schaetzle et al., "Salinity Gradient Energy: Current State and New Trends", Engineering, vol. 1, Issue 2, Jun. 2016, pp. 164-166.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Soloveichik, "Flow Batteries: Current Status and Trends", Chem. Rev. 2015, 115, 20, pp. 11533-11558.
US Dept. of Energy, "Desiccant Enhanced Evaporative Air-Conditioning (DEVap): Evaluation of a New Concept in Ultra Efficient Air Conditioning", Technical Report NREL/TP-5500-49722, 2011.
US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010, 2014, 34 pages.
Urban, "Emerging Scientific and Engineering Opportunities within the Water-Energy Nexus", Joule, Dec. 20, 2017, pp. 665-688.
Vermaas et al., "High Efficiency in Energy Generation from Salinity Gradients with Reverse Electrodialysis", ACS Sustainable Chem. Eng. 1, 2013, pp. 1295-1302.
Viswanathan et al., "Cost and performance model for redox flow batteries", Journal of Power Sources, vol. 247, Dec. 23, 2012, pp. 1040-1051.
Woods, "Membrane processes for heating, ventilation, and air conditioning", Renewable and Sustainable Energy Reviews, vol. 33, 2014, pp. 290-304.
Wu et al., "Kinetic study on regeneration of Fe(II)EDTA in the wet process of NO removal", Chemical Engineering Journal 2008, 140 (1), 130-135.
Beh et al., U.S. Appl. No. 16/200,289, filed Nov. 26, 2018.
Benedict et al., U.S. Appl. No. 16/200,376, filed Nov. 26, 2018.
Beh et al., U.S. Appl. No. 16/378,769, filed Apr. 9, 2019.
Benedict et al., U.S. Appl. No. 16/386,389, filed Apr. 17, 2019.
Al-Jubainawi et al., "Factors governing mass transfer during membrane electrodialysis regeneration of LiCl solution for liquid desiccant dehumidification systems", Sustainable Cities and Society, vol. 28, Aug. 26, 2016.
International Search Report and Written Opinion dated Mar. 9, 2020 for PCT/2019/063157 dated Mar. 9, 2020, 16 pages.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
Yang et al., "A Natural Driven Membrane Process for Brackish and Wastewater Treatment: Photovoltaic Powered ED and FO Hybrid System", Environmental Science and Technology, Sep. 4, 2013, pp. 10548-10555.
BTMAP-VI et al., "Ordering and Customer Service Neutral pH Aqueous Redox Flow Battery Materials", Jan. 1, 2017, pp. 639.
International Search Report and Written Opinion dated Mar. 9, 2020 for PCT/US2019/062924, 17 pages.
Epsztein et al., "Activation behavior for ion permeation in ion-exchange membranes: Role of ion dehydration in selective transport", Journal of Membrane Science 580, 2019, pp. 316-326.
Kaibara et al., Study of Ion Transport across Amphoteric Ion Exchange Membrane. II. Transport of Symmetric Tetraalkylammonium Chlorides?,, Bull. Chem. Sco. Jpn, 56, 1983, pp. 1346-1350.
Bajpayee et al., "Very low temperature membrane-free desalination by directional solvent extraction", Energy Environ. Sci. 2011, 4 (5), 1672.
Dai, "Increasing drought under global warming in observations and models", Nat. Clim.Change 2013, 3 (1), 52-58.
Darling et al., "Pathways to low-cost electrochemical energy storage: a comparison of aqueous and nonaqueous flow batteries", Energy Environ. Sci. 2014, 7 (11), 3459-3477.
Ferguson et al., "Studies on Overvoltage. IX: The Nature of Cathode and Anode Discharge Potentials at Several Metal Surfacesl,2", J. Phys. Chem. 1937, 42 (2), 171-190.
Gowin, "Examining the economics of seawater desalination using the DEEP code", Nuclear Power Technology Development Section, I. A. E. A., Ed. Vienna, Austria, 2000.
Gu et al., "A multiple ion-exchange membrane design for redox flow batteries", Energy Environ. Sci. 2014, 7 (9), 2986.
John et al., "Seasonal cycles of temperature, salinity and water masses of the western Arabian gulf", Oceanol. Acta 1990, 13 (3), 273-281.
Konopka et al., "Diffusion coefficients of ferri- and ferrocyanide ions in aqueous media, using twin-electrode thin-layer electrochemistry", Anal. Chem. 1970, 42 (14), 1741-1746.
La Mantia et al., "Batteries for efficient energy extraction from a water salinity difference", Nano Lett. 2011, 11 (4), 1810-3.
Lee et al., "Rocking chair desalination battery based on Prussian blue electrodes", ACS Omega 2017, 2 (4), 1653-1659.
Loutatidou, et al., "Capital cost estimation of RO plants: GCC countries versus southern Europe", Desalination 2014, 347, 103-111.
Nair et al., "Water desalination and challenges: The Middle East perspective: a review", Desalin. Water Treat. 2013, 51 (10-12), 2030-2040.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Seto et al., "Seawater desalination by electrodialysis", Desalination 1978, 25 (1), 1-7.
Solveichik, "Flow batteries: current status and trends", Chem. Rev. 2015, 115 (20), 11533-58.
Stillwell et al., "Predicting the specific energy consumption of reverse osmosis desalination", Water 2016, 8 (12).
Ye et al., "Performance of a mixing entropy battery alternately flushed with wastewater effluent and seawater for recovery of salinity gradient energy", Energy Environ Sci. 2014, 7 (7), 2295-2300.
Cheng et al., "Double-Stage Photovoltaic/Thermal ED Regeneration for Liquid Desiccant Cooling System", Energy and Buildings, 51, 2012, pp. 64-72.
Extended European Search Report for EP 22150661.1 issued by the European Patent Office dated Jun. 9, 2022; 14 pgs.
Wang et al., "Continuous desalination with a metal-free redox-mediator", Journal of Materials Chemistry A, No. 7, 2019, 7 pages.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Petrova et al., "Perfluorinated hybrid membranes modified by metal decorated clay nanotubes", Journal of Membrane Science, vol. 582, Jul. 15, 2019, pp. 172-181.
Pismenskaya et al., "Can the electrochemical performance of heterogeneous ion-exchange membranes be better than that of homogeneous membranes?", Journal of Membrane Science, vol. 566, Nov. 15, 2018, pp. 54-68.
Shah et al., "Comparative Studies on Performance of Interpolymer and Heterogeneous Ion-Exchange Membranes for Water Desalination by Electrodialysis", Desalination 172, 2005, pp. 257-265.

* cited by examiner

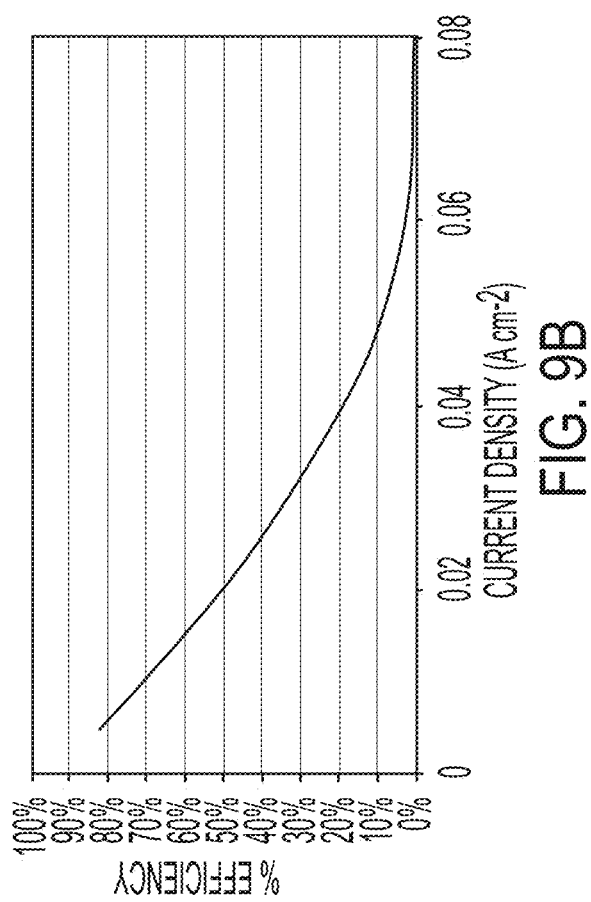

ELECTROCHEMICAL DESALINATION SYSTEM

RELATED APPLICATIONS

This application claims the benefit of U.S. provisional patent application Ser. No. 62/627,449, filed on Feb. 7, 2018, and U.S. provisional patent application Ser. No. 62/628,573, filed on Feb. 9, 2018, to which priority is claimed pursuant to 35 U.S.C. § 119(e), and which are incorporated herein by reference in their entirety.

TECHNICAL FIELD

This disclosure relates generally to desalination-salination systems that are optionally capable of energy storage, methods of operating the same, and an electrochemical battery for use in the systems.

BACKGROUND

Deployment of grid-scale electrical energy storage enables deep penetration of energy generation from intermittently available renewables. Today's batteries provide the capability for load shifting but high prices are still holding back widespread integration of storage, and consequently may slow the adoption of renewables. At the same time, rising water scarcity has forced the installation of energy-intensive desalination technologies to meet the growing water demand.

For example, there is an ever-increasing pressure on supplies of fresh water as a result of climate change and the relentless pace of population growth worldwide. For communities located in areas where there is no ready access to fresh water, such as the Persian Gulf and other desert areas, fresh water is produced through desalination of seawater. In these locations, this process is highly energy intensive whether it is driven hydraulically (e.g., through reverse osmosis (RO)), thermally (e.g., through flash distillation), or electrochemically (e.g., through electrodialysis). Elsewhere, all of these methods are routinely employed to treat contaminated wastewater from industrial activity.

In addition, the price of electricity generation from renewable sources is rapidly falling, driven primarily by technological improvements in solar and wind generation. As recently as October 2017, Saudi Arabia received a bid to provide electricity from solar power at a price of $17.90/MWh for a 300 MW plant. This ready availability of cheap electrons presents an opportunity for electrochemical methods of water desalination (or treatment) to play a greater role in meeting the rising demand for water. Described herein are systems and processes that reduce both energy consumption and overall costs for desalination using an electrochemical battery.

SUMMARY

Embodiments described herein are directed to a liquid desiccant regeneration system. The system comprises an electrodialysis apparatus comprising first and second reservoirs, each having an input and an output, wherein concentration of an input solution is increased to a threshold concentration in the first reservoir and concentration of the input solution in the second reservoir decreases during an operation mode. A first redox-active electrolyte chamber comprises at least one first electrode and a first solution of a redox-active electrolyte material and is configured to have a reversible redox reaction with the first redox-active electrolyte material to drive at least one ion into the input solution in the first reservoir. A second redox-active electrolyte chamber comprises at least one second electrode and a second solution of a redox-active electrolyte material and is configured to have a reversible redox reaction with the second redox-active electrolyte material to accept at least one ion from the input solution in the second reservoir. A first type of membrane is disposed between the first and second reservoirs, and a second type of membrane, different from the first type, is disposed between the first redox-active electrolyte chamber and the first reservoir and disposed between the second redox-active electrolyte chamber and the second reservoir.

Further embodiments are directed to a system comprising a dehumidification unit configured to dilute a liquid desiccant from a first concentration to a second concentration, a first electrodialytic battery unit, a switching unit, and a transport system. The electrodialytic battery comprises a first reservoir coupled to the dehumidification unit to receive the liquid desiccant having the second concentration and comprises an output, wherein the liquid desiccant having the second concentration in the first reservoir is increased in concentration to a third concentration or decreased in concentration to a fourth concentration during an operation mode. A second reservoir is also coupled to the dehumidification unit to receive the liquid desiccant having the second concentration and comprises an output, wherein concentration of the liquid desiccant having the second concentration in the second reservoir is changed in the opposite manner as the liquid desiccant in the first reservoir during the operation mode. A first redox-active electrolyte chamber comprises at least one first electrode and a first solution of a redox-active electrolyte material and is configured to have a reversible redox reaction with the first redox-active electrolyte material to drive at least one ion into, or accept at least one ion from, the liquid desiccant having the second concentration in the first water reservoir. A second redox-active electrolyte chamber comprises at least one second electrode and a second solution of a redox-active electrolyte material and is configured to have a reversible redox reaction with the second redox-active electrolyte material to accept at least one ion from, or drive at least ion into, the liquid desiccant having the second concentration in the second water reservoir. The battery further includes a first type of membrane is disposed between the first and second reservoirs, and a second type of membrane, different from the first type, is disposed between the first redox-active electrolyte chamber and the first reservoir and disposed between the second redox-active electrolyte chamber and the second reservoir. The switching unit comprises a first switch coupled to the output of the first reservoir and a second switch coupled to the output of the second reservoir. The transport system is coupled to the switching unit and the dehumidification unit and is configured to transport the liquid desiccant having the third concentration from the first or second reservoir to the dehumidification unit.

Additional embodiments are directed to methods. The methods include using a liquid desiccant in a dehumidification process to remove water from a material and dilute the liquid desiccant from a first concentration to a second concentration. The diluted liquid desiccant is transported into the first and second reservoirs of an electrodialysis apparatus, and the electrodialysis apparatus is operated to generate a first output comprising a liquid desiccant having a threshold concentration and to generate a second output comprising a majority of water. The first output is then transported to the dehumidification process. The electrodialysis apparatus comprises first and second reservoirs, each comprising an input and an output, wherein concentration of a liquid desiccant is increased to a threshold concentration in the first reservoir and decreases in the second reservoir during an operation mode. A first redox-active electrolyte chamber comprises at least one first electrode and a first solution of a redox-active electrolyte material and is configured to have a reversible redox reaction with the first redox-active electrolyte material to drive at least one ion into the liquid desiccant in the first reservoir. A second redox-active electrolyte chamber comprises at least one second electrode and a second solution of a redox-active electrolyte material and is configured to have a reversible redox reaction with the second redox-active electrolyte material to accept at least one ion from the liquid desiccant in the second reservoir. The apparatus also includes a first type of membrane disposed between the first and second reservoirs and a second type of membrane, different from the first type, disposed between the first redox-active electrolyte chamber and the first reservoir and disposed between the second redox-active electrolyte chamber and the second reservoir;

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

FIGS. 9A-D are graphs of system costs, revenues, and performance metrics for a four chambered electrodialytic battery using optimistic pricing for water and electricity in the Persian Gulf region;

DETAILED DESCRIPTION

Figure 1A:
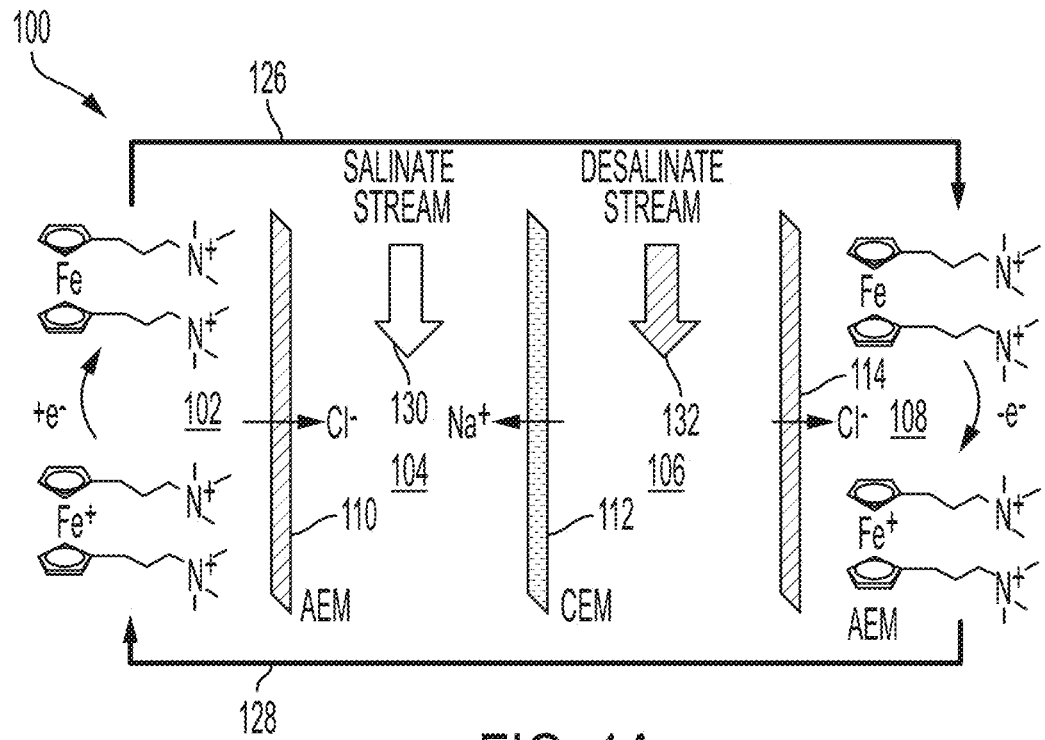
FIG. 1A is a schematic diagram of an electrodialysis system with a positively charged redox shuttle in accordance with certain embodiments.

The present disclosure is generally related to electrochemical desalination systems and optionally, corresponding, simultaneous energy storage. Current research efforts in grid storage have been beholden to a singular approach—minimizing the cost per kWh, which currently has a Department of Energy cost target of $125/kWh by 2022. An alternative strategy is to increase the revenue associated with each kWh of storage, an alternative that is not available to conventional energy storage technologies. However, since the electrochemical batteries described herein produce a valuable secondary product, desalinated water, during charging and discharging, this alternative is possible. Because aqueous flow batteries share many capital requirements (e.g. pumps, membranes, plumbing) with electrochemical desalination technologies, a system that combines the two could lead to significant capital cost savings compared to two separate systems. Revenue from the desalinated water compensates for additional capital costs and leverages process intensification to break below the $/kWh barrier encountered by traditional energy storage technologies. Electrochemical approaches to desalination have the potential to scale modularly and ramp production easily, while maintaining high energetic efficiency and the ability to process high-salinity feeds.

The current state of the art in electrochemical water desalination is electrodialysis; however, it currently consumes comparatively more energy for salt removal (e.g., ~0.26-0.30 kWh/kg NaCl) than other desalination techniques like reverse osmosis (e.g., 0.06-0.08 kWh/kg NaCl) but less than for thermal techniques like vapor compression (e.g., 0.6-1.0 kWh/kg NaCl). Capacitive deionization uses electrical energy but is also energy intensive at about 0.22 kWh/kg NaCl and is best suited for removing minute amounts of dissolved salts from water because the electrodes have to be solid, by definition. While electrodialysis is a technique that can be employed to treat brines at any salinity, unlike reverse osmosis, it has seen limited use because of its high specific energy consumption for salt removal.

Because the energy consumption in electrodialysis is proportional to the applied voltage, reducing (or minimizing) the voltage that has to be applied to a cell will reduce the specific energy consumption of the electrodialysis stack. In conventional electrodialysis, ions are driven out of, or into, seawater by Faradaic reactions at an anode and cathode. In most cases, the Faradaic reactions are simply that of water splitting: water is oxidized to oxygen at the anode and reduced to hydrogen at the cathode. This creates a charge imbalance at the electrodes that is balanced by the movement of ions through strategically placed ion-selective membranes. However, water splitting involves an energetic penalty because energy is required to do so. The problem is exacerbated by the fact that significant overpotentials are associated with both water oxidation and reduction. Moreover, oxygen and chlorine gas generated at the anode are highly destructive and require the use of platinum/iridium-plated electrodes.

In the state of California alone, if all in-state fossil fuel sources of electrical generation (0.40 quads, 41% of all sources) were to be replaced by solar and paired with the desalination battery for storage as described herein, it would enable an additional 0.63 quads of solar generation to be brought online, based on a cost-optimized round-trip energy efficiency of 64%. At the same time, the desalination battery would provide a water resource that is equivalent to 30% of state consumption.

An electrochemical cell, as described herein, is designed to perform electrodialysis in an energy-efficient manner by circulating a redox-active species that is dissolved in water from the anode to the cathode and back again. The redox-active species has rapid kinetics for reduction or oxidation, which greatly reduces the high operating voltage required for conventional electrodialysis, in which water splitting drives salt transport across membranes such as ion-selective membranes. Reducing the operating voltage reduces the specific consumption of energy because the specific energy consumption is proportional to the operating voltage. The system can furthermore be reversibly adapted for coupled electrical energy storage, by pairing two separate redox couples at the anode and cathode instead of a single redox shuttle that is circulated around both.

Figure 1B:
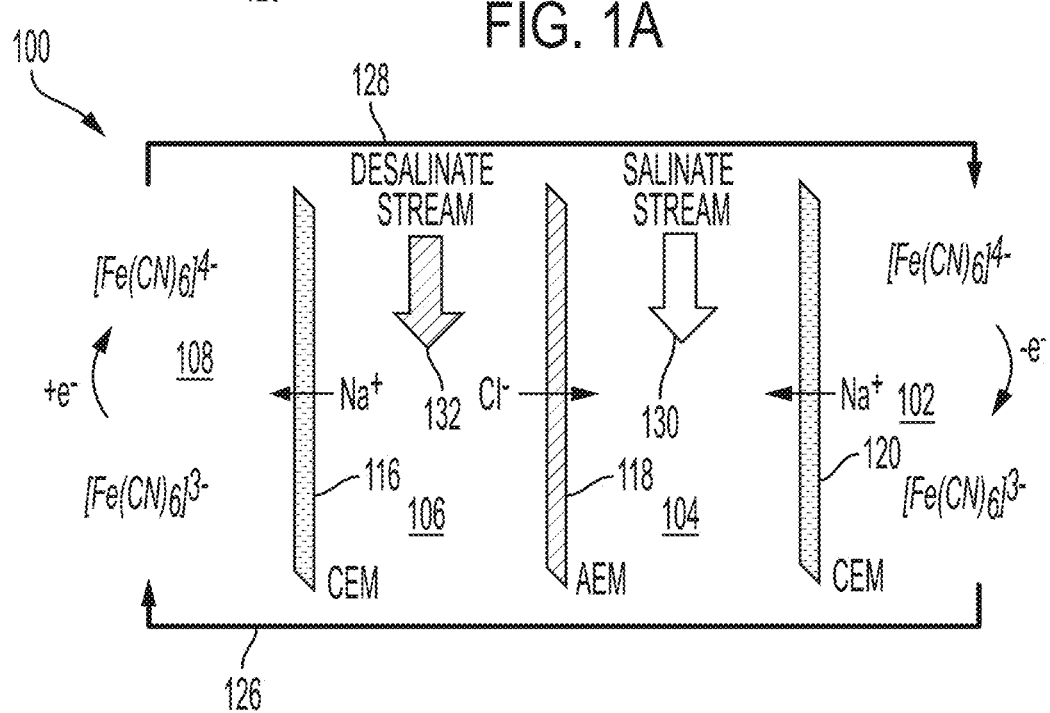
FIG. 1B is a schematic diagram of an electrodialysis system with a negatively charged redox shuttle in accordance with certain embodiments.

In certain embodiments of an energy-efficient, low-potential electrodialysis system, a redox carrier that is dissolved in water is reduced at the cathode, then shuttled to the anode where it is reoxidized and subsequently redelivered to the cathode to complete the cycle. Turning to FIGS. 1A-B, an electrochemical cell 100 providing energy-efficient electrodialysis, according to such embodiments, is shown. The cell 100 consists of four chambers 102, 104, 106, 108 in series. Each chamber is separated from its neighbor by an appropriate membrane 110, 112, 114 (FIG. 1A) or 116, 118, 120 (FIG. 1B). The two central chambers 104, 106 contain a salinate stream 130 and a desalinate stream 132, and the two outer chambers 102, 108 respectively contain the cathode and the anode (FIG. 1A) or the anode and the cathode (FIG. 1B). The membranes may be ion-selective membranes such as cation exchange membranes or anion exchange membranes depending upon the cell design. If the redox shuttles have a high enough molecular weight (e.g., are dendrimeric or polymeric in nature), the membranes may be microporous membranes. The membranes may also incorporate some ion-selective elements and some microporous elements within the same membrane. In certain embodiments, the membranes may also be composite membranes.

For example, FIG. 1A illustrates a redox-assisted electrodialysis system with a positively charged redox shuttle (i.e., 1,1'-bis(trimethylammoniopropyl)ferrocene dichloride (BT-MAP-Fc)). Movement of the redox shuttle from the anode 108 to the cathode 102 is shown by arrow 128 and from the cathode 102 to the anode 108 by arrow 126. The cathode chamber 102 and the salinate chamber 104 are separated by an anion exchange membrane 110, and the anode chamber 108 and the desalinate chamber 106 are also separated by an anion exchange membrane 114. However, membranes 110 and 114 may not necessarily comprise the same material or be of similar dimensions. The salinate chamber 104 is also separated from the desalinate chamber 106 by a cation exchange membrane 112. As can be seen, chloride and sodium ions cross membranes 110 and 112 to enter the salinate stream 130 in chamber 104 while they cross membranes 114 and 112 to leave the desalinate stream 132 in chamber 106.

Using a negatively charged redox shuttle (e.g., ferrocyanide/ferricyanide (Fe(CN))) alters the cell 100 design as shown in FIG. 1B. Here, movement of the redox shuttle from the cathode 108 to the anode 102 is shown by arrow 128 and from the anode 102 to the cathode 108 by arrow 126. The anode chamber 102 and the salinate chamber 104 are separated by a cation exchange membrane 120, and the cathode chamber 108 and the desalinate chamber 106 are also separated by a cation exchange membrane 116. However, membranes 120 and 116 may not necessarily comprise the same material or be of similar dimensions. The salinate chamber 104 is also separated from the desalinate chamber 106 by an anion exchange membrane 118. As can be seen, chloride and sodium ions cross membranes 118 and 120 to enter the salinate stream 130 in chamber 104 while they cross membranes 116 and 118 to leave the desalinate stream 132 in chamber 106.

In various embodiments, an arbitrary number of pairs of alternating salinate and desalinate chambers can be employed. However, water splitting may start to occur at a high number of chambers once the applied voltage exceeds 1.26 V. While solid redox carriers may be employed in various embodiments, they require large amounts of the carriers and frequent switching of salinate and desalinate streams because solid redox-active materials cannot be easily transported from one side of the electrochemical cell to the other.

Energy efficiency of the cell 100 is achieved through selection of the redox carrier/shuttle. An effective redox carrier possesses as many of the following properties as possible. For example, the redox carrier should be chemically stable in oxidized and reduced forms, remain highly water-soluble in oxidized and reduced forms, and not be oxygen sensitive in oxidized and reduced forms. The carrier should not be proton coupled, should possess rapid redox kinetics, and should be chemically compatible with any component present in the water being treated. Further, the carrier should have low permeability through ion-selective membranes and be nontoxic.

The most popular redox carriers that have been reported to date are iron-containing compounds, including $Fe^{2-}/Fe^{3+}$, the ferrocyanide/ferricyanide (Fe(CN)) couple, and Fe(II)-EDTA/Fe(III)-EDTA. All three have been considered for use in reverse electrodialysis, i.e., the generation of electricity from salinity gradients instead of the consumption of electricity to create a salinity gradient. The use of a redox couple for conventional electrodialysis has not yet been reported. Unfortunately, $Fe^{3+}$ ions are only soluble at low pH and form insoluble oxides or hydroxides at neutral pH, Fe(CN) forms highly insoluble Prussian Blue—type compounds upon contact with many transition metals (especially iron), and Fe-EDTA complexes show limited electrochemical stability.

While a system with Fe(CN) as the redox carrier may be successfully demonstrated in the laboratory with only NaCl as simulated seawater, the ubiquitous presence of calcium and iron in seawater (typically at levels of 400 parts per million (ppm) and 1-3 parts per billion (ppb), respectively) will quickly cause membrane fouling when these ions cross over into the reservoirs. There, they form insoluble precipitates of potassium calcium and iron upon contact with Fe(CN). Furthermore, even neutral to slightly acidic conditions, which are created at the anode, will cause the release of highly toxic hydrogen cyanide.

Figure 7A:
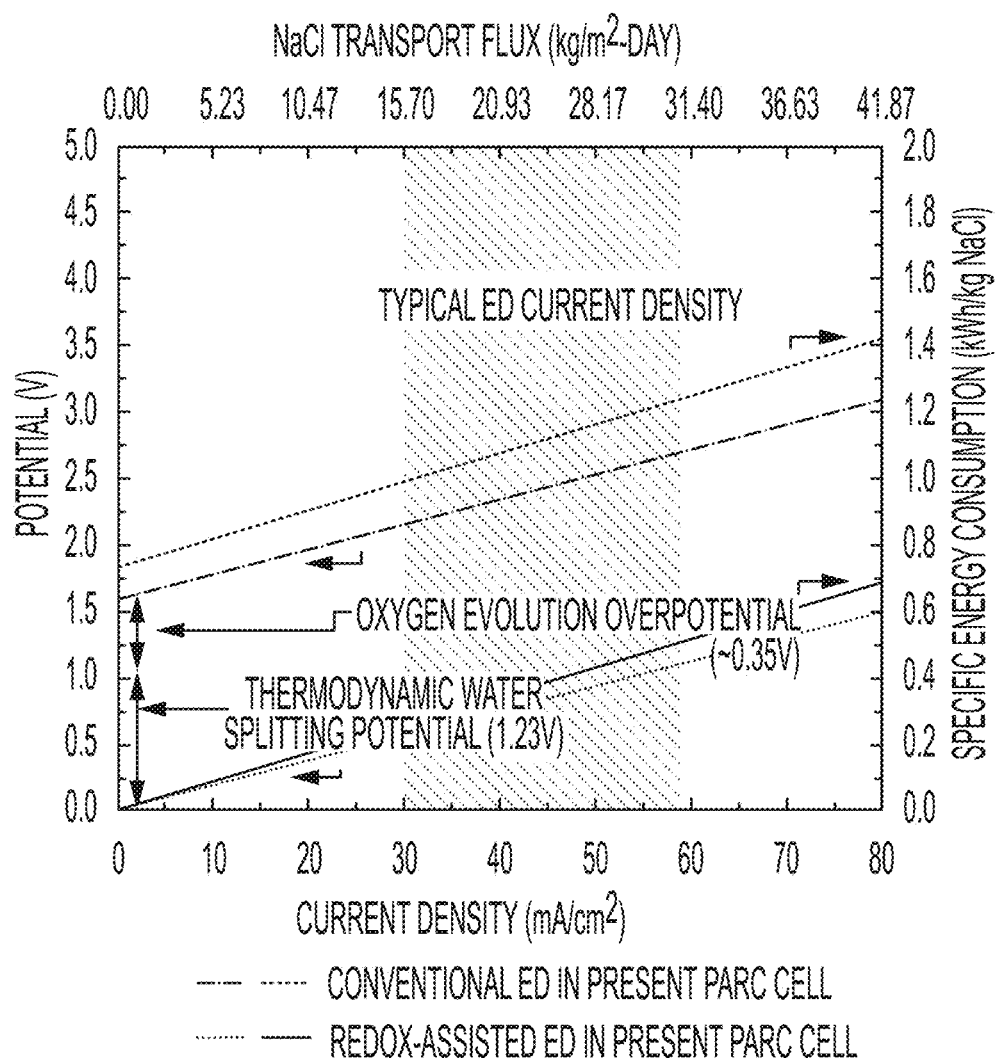
FIG. 7A is a graph comparing operating potential and specific energy consumption for conventional and redox-assisted electrodialysis systems in the cell stack of FIG. 5.
Figure 7B:
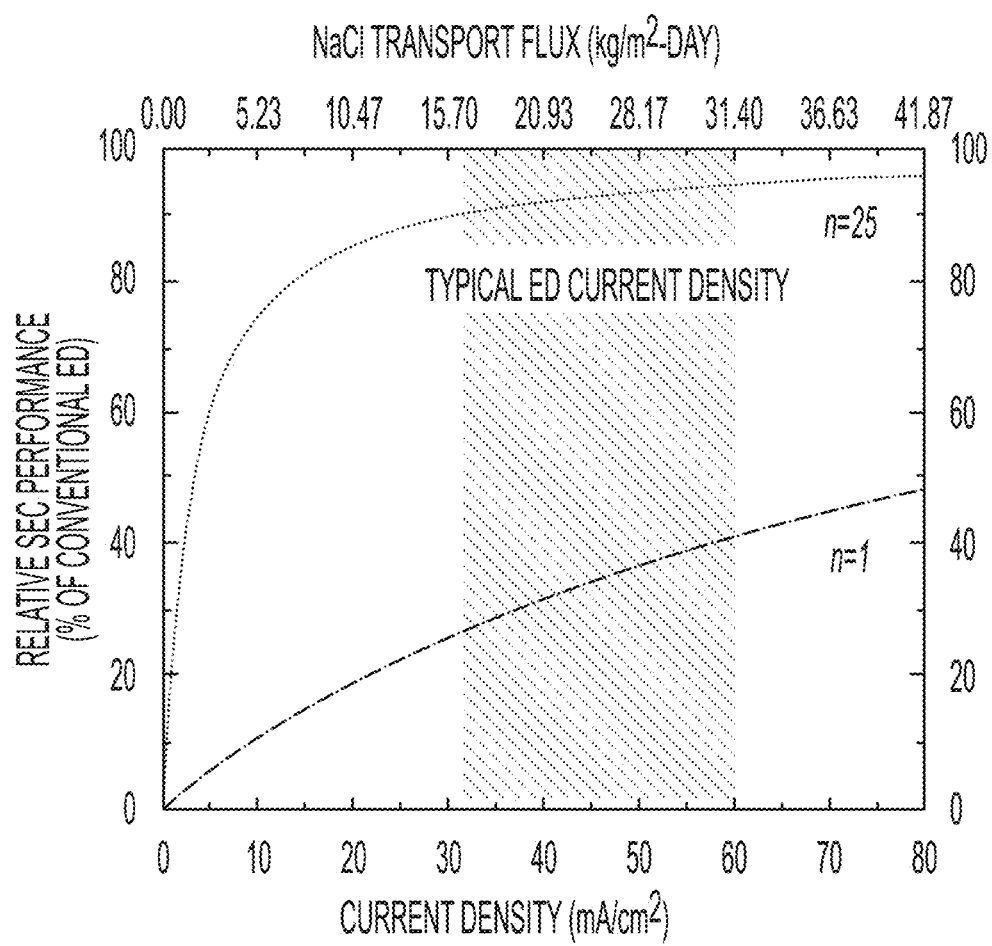
FIG. 7B is a graph comparing relative specific energy consumption for conventional and redox-assisted electrodialysis systems for varying number of pairs of salinate/desalinate chambers per anode and cathode.

However, a ferrocene derivative that possesses all of the attributes listed above can be a suitable redox carrier, for example, BTMAP-Fc. This is compared with various iron-containing redox couples in Table 1 below.

energy storage device (i.e., an electrodialytic battery). When the cell uses a small number of salinate/desalinate chamber pairs (e.g., one pair), the performance is improved over traditional electrodialysis as shown in FIG. 7B. A fewer number of chamber pairs is also advantageous for energy storage applications where preferred operating current density is also lower than that for electrodialysis. The above-described cell is adapted for energy storage by using two different redox-active reactants as separate anolytes and catholytes instead of shuttling the same compound between the anode and cathode. Unlike three-chambered cell designs (e.g., U.S. Pat. Nos. 9,340,436; 9,670,077; and 9,673,472, each of which is incorporated herein by reference), a four-chambered design is capable of continuous production of desalinated water at all times during operation—instead of only half of the time. Also, the four-chambered design does not suffer from precipitation of insoluble solids if crossover takes place.

Figure 2A:
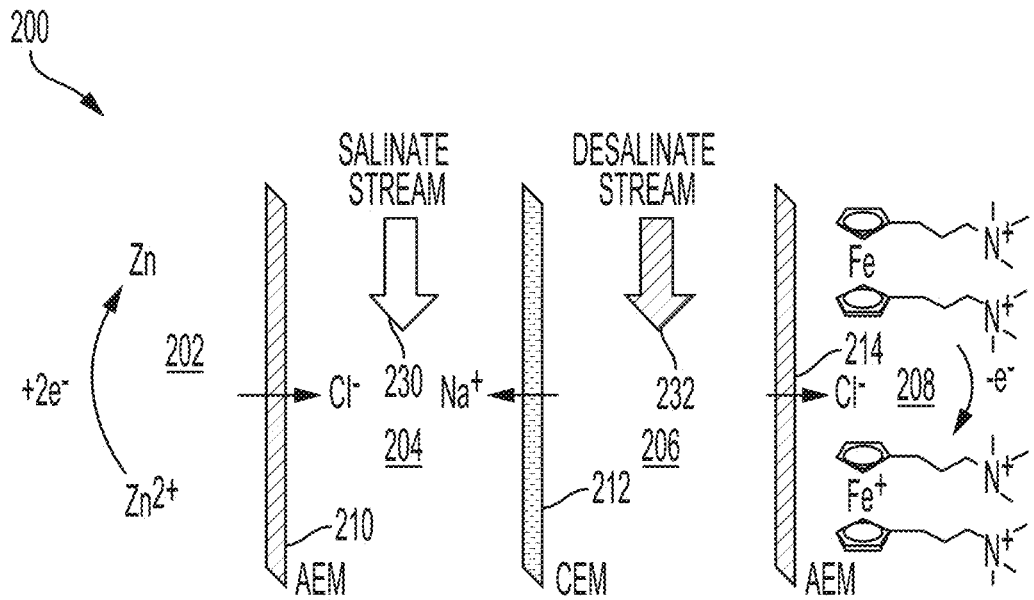
FIG. 2A is a schematic diagram of a charge cycle of an electrodialytic battery with a pair of positively charged reactants in accordance with certain embodiments.
Figure 2B:
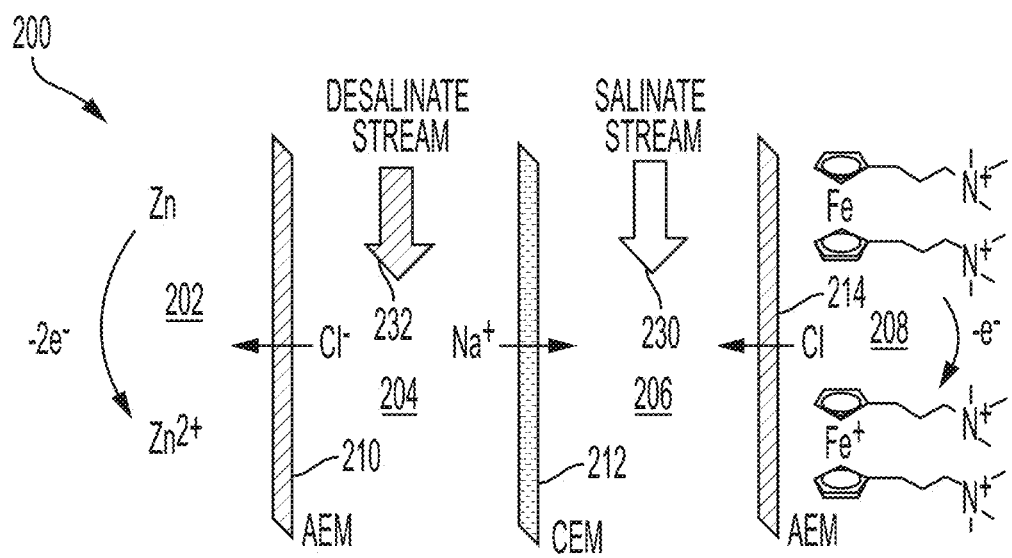
FIG. 2B is a schematic diagram of a discharge cycle of the electrodialytic battery of FIG. 2A in accordance with certain embodiments.

Embodiments of the four-chambered electrodialytic battery are shown in FIGS. 2A-B. The desalination battery is a multi-chambered flow battery. Reduction of the anolyte and oxidation of the catholyte during a charge half-cycle moves $Na^+$ and $Cl^-$ ions through appropriate ion-selective membranes and into, or out of, intervening chambers that hold seawater. The reverse process takes place during the discharge half-cycle. At all points during cycling, one of the water chambers experiences a net influx of salt while the other sees a net efflux. The energy required to effect the desalination is simply the difference in energy input during charging and the energy recovered during discharging.

TABLE 1

|  | $Fe^{2+}/Fe^{3+}$ | Fe(EDTA) | Fe(CN) | BTMAP-Fc |
| --- | --- | --- | --- | --- |
| Chemical and electrochemical stability | Excellent | Poor | Excellent (but ferricyanide is light sensitive) | Excellent |
| Solubility at pH 7 | $Fe^{3+}$ is insoluble | 0.4M | 0.6M | 1.9M |
| Oxygen sensitive | No | No | No | No |
| Kinetic rate constant on glassy carbon | $1.2 \times 10^{-4}$ cm/s | $2.6 \times 10^{-2}$ cm/s[†] | $\sim 1 \times 10^{-1}$ cm/s | $1.4 \times 10^{-2}$ cm/s |
| Forms insoluble precipitates with other ions | No | No | Yes | No |
| Permeability | Unknown | Unknown | $<1 \times 10^{-11}$ cm$^2$/s (Nafion 212)[‡] | $6.2 \times 10^{-10}$ cm$^2$/s (Selemion DSV) |
| Toxicity | Low | Low | Generally low, but releases HCN at pH ≤7 | Expected to be low |

[†]On platinum
[‡]At pH 14

Notably, each of the redox couples, other than BTMAP-Fc, has at least one property that is inconsistent with the properties of an effective redox carrier for the above-discussed cell. For example, $Fe^{2+}/Fe^{3+}$ is insoluble at pH 7, Fe(EDTA) has poor chemical and electrochemical stability, and Fe(CN) forms insoluble precipitates with other ions and releases toxic HCN at a pH of 7 or less. In principle, any water-soluble redox carrier could be used in embodiments of the cell of FIGS. 1A-B, not just those listed in Table 1. For example, depending on the desired pH of the desalinate and salinate streams, other redox couples may be preferred. An example of such an energy-efficient redox assisted electrodialysis system is described further below.

The four-chambered cell design discussed above in connection with FIGS. 1A-B can also be adapted for use as an In FIG. 2A, the charge cycle of a four-chambered battery using a positively charged pair of reactants is illustrated. The battery includes four chambers 202, 204, 206, and 208 as well as three membranes 210, 212, and 214. During the charge cycle, the salinate stream 230 is in chamber 204 between the anolyte chamber 202 and chamber 206, which contains the desalinate stream 232. The catholyte chamber 208 is separated from chamber 206 and the desalinate stream 232 by an anion exchange membrane 214 while the anolyte chamber 202 is separated from chamber 204 and the salinate stream 230 by another anion exchange membrane 210. As discussed above, membranes 210 and 214 may not necessarily comprise the same material or be of similar dimensions. The salinate chamber 204 is also separated from the desalinate chamber 206 by a cation exchange membrane 212. During the charge cycle, chloride and sodium ions cross membranes 210 and 212 to enter chamber 204 forming the salinate stream 230 while they cross membranes 214 and 212 to leave chamber 206 forming the desalinate stream 232.

FIG. 2B shows the same battery of FIG. 2A during a discharge cycle. Thus, chloride and sodium ions are shown crossing membranes 210 and 212 to leave chamber 204 forming the desalinate stream 232 while they cross membranes 214 and 212 to enter chamber 206 forming the salinate stream 230. Notably, if the reactants were negatively charged, the membranes would be reversed: membranes 210, 214 would be cation exchange membranes and membrane 212 would be an anion exchange membrane. As before, membranes 210 and 214 may not necessarily comprise the same material or be of similar dimensions when they are cation exchange membranes. In the embodiments shown, the anolyte is zinc and the catholyte is BTMAP-Fc. However, in other embodiments, (ferrocenylmethyl)trimethylammonium chloride (FcNCl) can be used in place of BTMAP-Fc to increase the battery cell potential to about 1.41 V.

The anolytes and catholytes are not restricted to the above-described embodiments. The redox-active component of the anolyte and/or catholyte can be an aqueous solution of any combination of the following, in one or more of their oxidation states, as their ions or oxocations or oxoanions and/or complexed to ligand(s): titanium(III), titanium(IV), vanadium(II), vanadium(III), vanadium(IV), vanadium(V), chromium(II), chromium(III), chromium(VI), manganese (II), manganese(III), manganese(VI), manganese(VII), iron (II), iron(III), iron (VI), cobalt(II), cobalt(III), nickel(II), copper(I), copper(II), zinc(II), ruthenium(II), ruthenium (III), tin(II), tin(IV), cerium(III), cerium(IV), tungsten(IV), tungsten(V), osmium(II), osmium(III), lead(II), zincate, aluminate, chlorine, chloride, bromine, bromide, tribromide, iodine, iodide, triiodide, polyhalide, halide oxyanion, sulfide, polysulfide, sulfur oxyanion, ferrocyanide, ferricyanide, a quinone derivative, an alloxazine derivative, a flavin derivative, a viologen derivative, a ferrocene derivative, any other metallocene derivative, a nitroxide radical derivative, a N,N-dialkyl-N-oxoammonium derivative, a nitronyl nitroxide radical derivative, and/or polymers incorporating complexed or covalently bound components of any of the aforementioned species.

The anolyte and catholyte may also include an aqueous solution of the components of a pH buffer that may or may not be redox-active under typical operating conditions. In certain aqueous embodiments, the pH of the anolyte and catholyte is matched to the pH of the electrolyte in the central chambers, which may, for example, be near neutral (pH 5-9) for water desalination, acidic (pH 0-5) for treating acidic wastewater, or alkaline (pH 9-14) for treating alkaline wastewater. In some embodiments, it can be advantageous for the anolyte pH to be slightly lower than the other chambers such as when the anolyte is zinc/zinc chloride. In further embodiments, the pH of each of the electrolytes in the system is substantially the same within the electrochemical cell. In still further embodiments, the anolyte, catholyte, and water each has a pH between and including 3-10. Thus, the cell may include a pH monitoring and adjustment system for periodic and/or continuous pH monitoring and adjustment.

In further embodiments, an electryodialytic battery cell as described in FIGS. 2A-B can be coupled to an energy storage system when designed as a flow battery. Flow batteries are attractive for energy grid storage because they allow the energy storage capacity of the battery to be decoupled from the power that the battery can deliver. Aqueous flow batteries can be integrated into an electrochemical desalination system because they share many common desalination capital requirements such as pumps, plumbing, and cell stack designs, which can be exploited to perform both desalination and energy storage. In principle, incorporating electrical energy storage into a desalination battery would enable further reductions in cost by facilitating load shifting on the electrical grid, enabling electricity arbitrage, and/or enabling deferral of investments into transmission and distribution infrastructure. A desalination battery with a high cell potential would function as a viable energy storage device. By tapping the revenue streams that are available to an energy storage technology, the system can defray desalination costs while simultaneously enabling increased adoption of renewables.

Figure 3A:
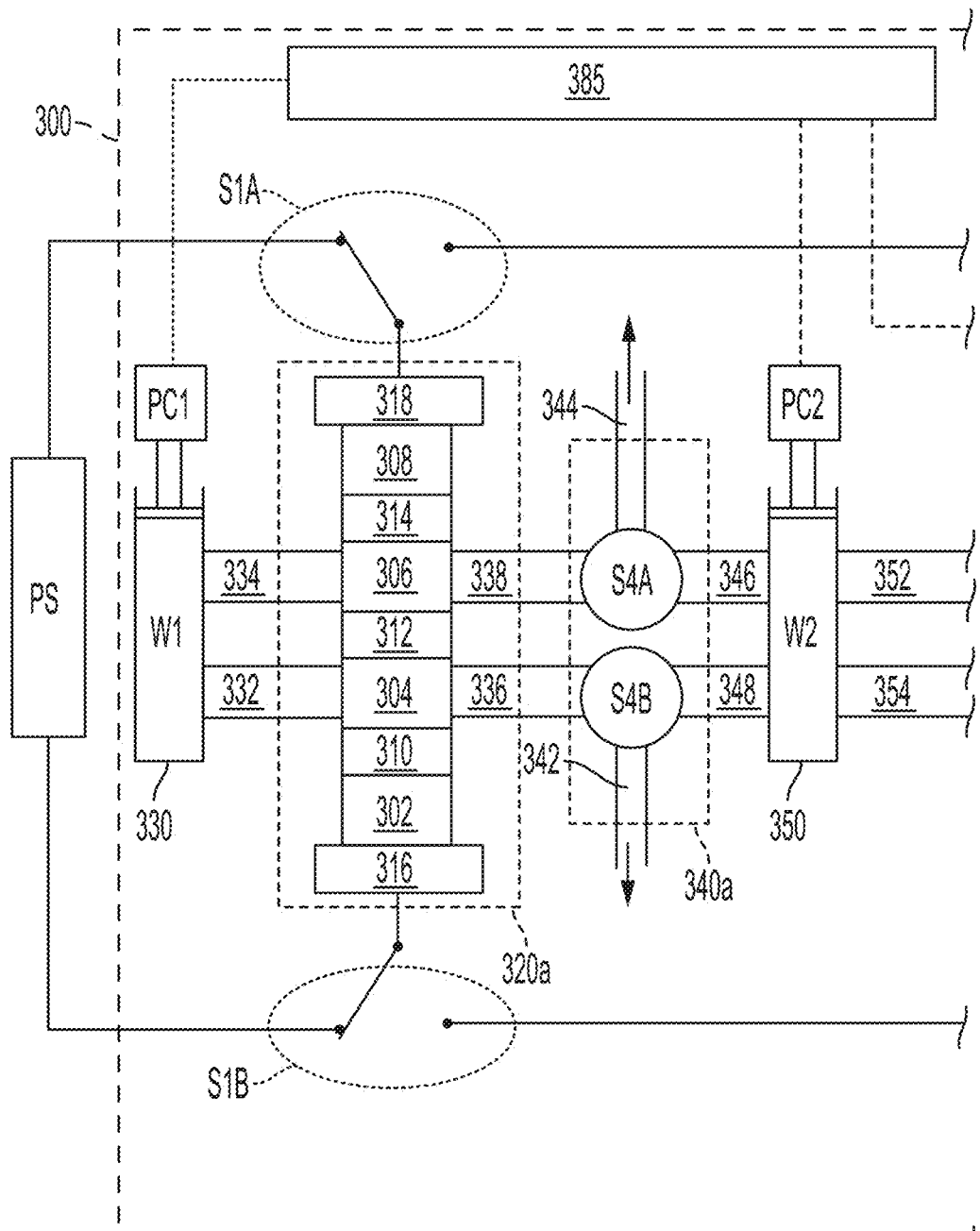
FIGS. 3A-B are a schematic diagram of an energy storage system as coupled to a power supply unit and a power grid in accordance with certain embodiments.
Figure 3B:
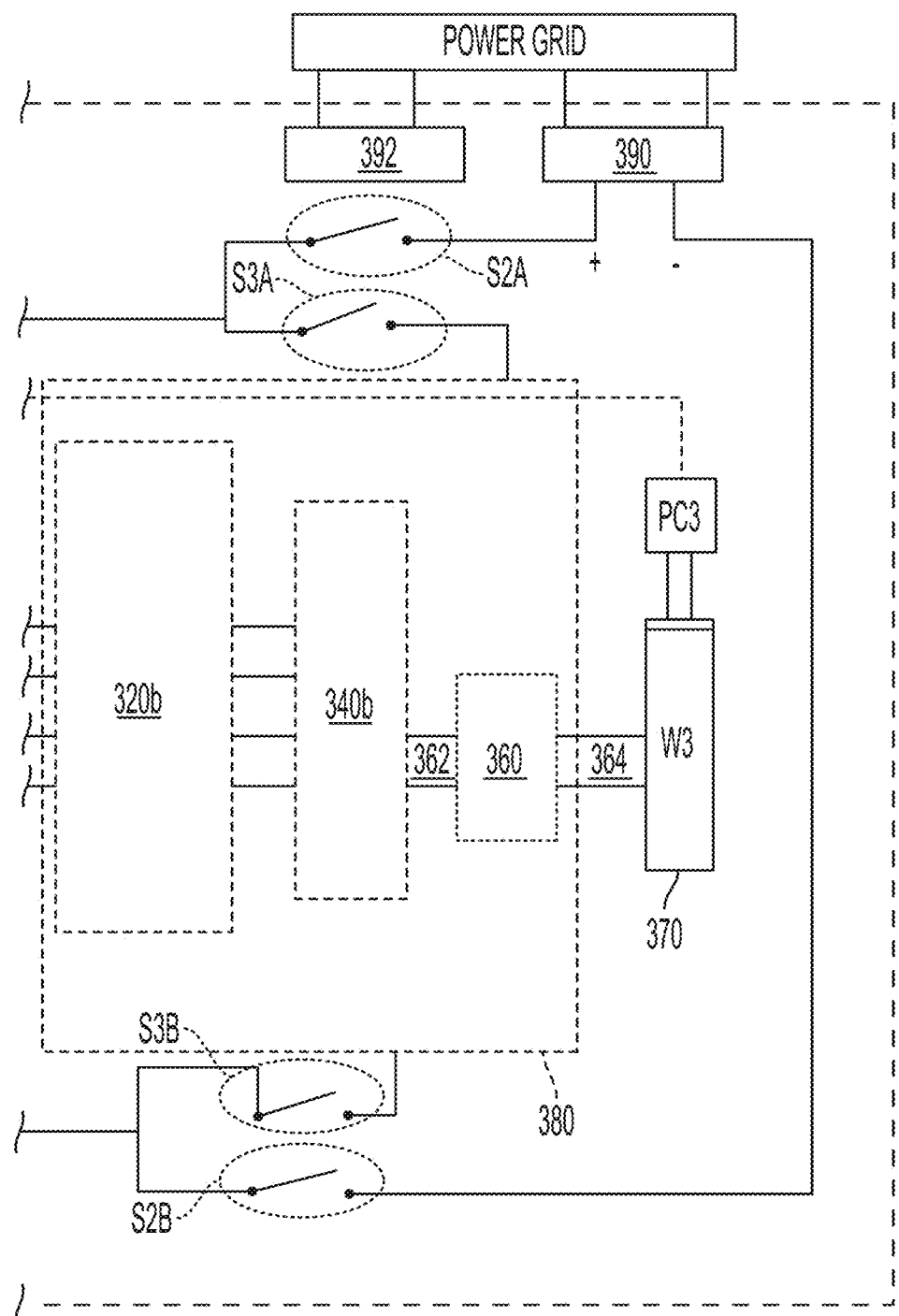

An example of an electrochemical desalination-salination system is illustrated in FIG. 3. The described electrochemical desalination battery can be operated in batch mode in certain embodiments or in a continuous mode in other embodiments. In batch mode, a volume of water to be treated is provided (e.g., pushed) in the redox desalination system. An electric potential is applied to the electrodes, and ions are collected in the two electrodes until the salt concentration in the desalination water chamber drops below a set limit (e.g. 5 parts per thousand (ppt) or 0.5 ppt). Then the water is removed from the system. In a continuous flow mode, water flows through the system, and the total residence time for a volume of water in each part of the system is sufficient to achieve a desired reduction in salt concentration. In certain embodiments, separate units can be broken up into different stages and/or components with independently controlled electrodes to accommodate decreasing salinity levels at each successive step during a desalination process. This can also accommodate increasing salinity levels at each successive step during a salination process.

Turning to FIG. 3, an energy storage system 300 includes an electrochemical desalination battery (EDB) unit 320a. A set of electrical switches (S1A, S1B, S2A, S2B, S3A, S3B) is provided within the energy storage system 300 to provide a multi-configuration electrical connection that connects various nodes of the energy storage system 300 to a power supply unit PS (which can be either AC or DC according to various embodiments described herein, whether or not so stated), a power (e.g. electric) grid, and/or to other nodes of the energy storage system 300, and any combinations thereof. As used herein, an "electrical switch" refers to any device that is capable of altering electrical connections of a circuit. The set of electrical switches (S1A, S1B, S2A, S2B, S3A, S3B) constitutes an operational mode control device that controls the operational modes of the energy storage system 300. As used herein, an "operational mode control device" refers to any device that can be employed to select an operational mode within a device configured to operate in two or more alternative operational modes. The operational mode control device is configured to select, among others, between a charge, discharge, and electrodialysis mode based on presence or absence of power demand from a power grid and/or availability of external power as provided by a power supply unit PS for operation of the energy storage system 300.

The EDB unit 320a includes an anode (318, 308) and a cathode (316, 302), which can be embodied in various configurations. The anode (318, 308) is capable of accepting and having a reversible redox reaction with the redox shuttle dissolved in water. The cathode (316, 302) is capable of accepting and having a reversible redox reaction with the redox shuttle dissolved in water. The anode (318, 308) includes a negative electrode plate 318 and an electrolyte chamber 308 for containing an electrolyte solution (i.e., anolyte). The cathode (316, 302) includes a positive electrode plate 316 and an electrolyte chamber 302 for containing an electrolyte solution (i.e., catholyte). In certain embodiments, one or both of the cathode and anode includes intercalation material as an optional component for battery chemistries that employ intercalation. The four-chambered cell operates when both the anolyte and the catholyte have the same sign of charge (i.e., both are positively charged or both are negatively charged).

Two electrolyte (e.g., water with dissolved salts such as sodium chloride) chambers 304, 306 are provided between the anode (318, 308) and the cathode (316, 302), and contain solution (e.g., water) to be salinated and desalinated, respectively.

In some embodiments, the separation distance between the anode (318, 308) and the cathode (316, 302) decreases along a direction of water flow during operation. Desalination is driven by ion diffusion in the EDB unit 320a. When the salt concentration decreases in the desalination chamber, it takes greater effort for the ions to reach the electrodes (i.e., the anode and the cathode), effectively increasing the cell resistance. Reducing the electrode distance at a rate that keeps the internal resistance substantially constant leads to an energy-efficient desalination process, as well as energy-efficient recharging during the salination process. In certain embodiments, the separation distance between the anode (318, 308) and the cathode (316, 302) can be roughly inversely proportional to the concentration of ions as the water in treatment passes through the water chambers 304, 306 either in the charge mode or in the discharge mode. In alternative embodiments, the separation distance between the anode (318, 308) and the cathode (316, 302) remains substantially constant, or increases.

The negative electrode plate 318 and the positive electrode plate 316 each include a solid conductive material. In a given EDB, the plates 318, 316 can comprise the same conductive material or different conductive materials. Each electrode plate 318, 316 can comprise one or more of the following solid materials: zinc, iron, chromium, nickel, lead, titanium, copper, tin, silver, lead(IV) oxide, manganese (IV) oxide, sulfur, Prussian blue, Prussian blue derivatives, transition metal analogs of Prussian blue, carbon fiber, graphite, carbon felt, conductive carbon black as a solid or as an aqueous suspension, and other conductive forms of carbon. If the electrode plates 318, 316 are porous, they can occupy some portion of the anolyte chamber 308 and catholyte chamber 302, through which the anolyte and catholyte are flowed. Alternatively, one or both of the electrode plates 318, 316 can be constructed as a gas diffusion electrode with hydrogen gas or oxygen gas as a reactant.

A first ion exchange membrane 314 is disposed between a first water chamber 306 and the anode (318, 308). In certain embodiments, the first ion exchange membrane 314 is an anion exchange membrane (AEM) that allows passage of anions and does not allow passage of cations, or it can be a negative-valence-selective membrane that allows passage of anions of lesser or greater negative charge while not allowing passage of anions of greater or lesser negative charge or positive ions. In one embodiment, the first ion exchange membrane 314 can be a semi-permeable membrane. An example of a material for the first ion exchange membrane is NEOSEPTA AFX by ASTOM Corporation (8 $cm^2$).

A second ion exchange membrane 312 is disposed between the first and second water chambers 306, 304. In certain embodiments (e.g., when the first ion exchange membrane is an AEM), the second ion exchange membrane 312 is a cation exchange membrane (CEM) that allows passage of cations and does not allow passage of anions, or it can be a positive-valence-selective membrane that allows passage of cations of lesser or greater positive charge while not allowing passage of cations of greater or lesser positive charge or negative ions. In one embodiment, the second ion exchange membrane 312 can be a semi-permeable membrane. An example of a material for the second ion exchange membrane is Fumasep™ FKE-50, by FuMA-Tech, GmbH, Germany (8 $cm^2$).

A third ion exchange membrane 310 is disposed between the second water chamber 304 and the cathode (316, 302). In certain embodiments (e.g., when the first ion exchange membrane 314 is an AEM), the third ion exchange membrane 310 is also an AEM. In embodiments where the first ion exchange membrane 314 is a CEM, the third ion exchange membrane 310 is also a CEM. The first and third ion exchange membranes 314, 310 are not necessarily comprised of the same materials and/or dimensions within the EDB unit 320a.

The EDB unit 320a is an electrochemical cell used to treat water, including desalination and salination. Both chambers 304, 306 receive the water to be treated. During the charging cycle, the electrolyte (e.g., salt) concentration in chamber 306 increases and the electrolyte concentration in chamber 304 decreases. Thus, in this embodiment, chamber 306 is a salination chamber and chamber 304 is a desalination chamber. As shown above, it is possible for these chambers to switch where chamber 306 is the desalination chamber and chamber 304 is the salination chamber. However, in all embodiments, the electrolyte concentrations in chambers 304, 306 will change in different directions during operation.

The water to be treated in chambers 304, 306 can include one or more electrolytes that may be treated. For example, the electrolyte in the chambers 304, 306 can be any combination of water-soluble ionic salts, including but not limited to, those encountered in seawater or wastewater. Example cations that can be present in the electrolyte include, but are not limited to, hydronium, lithium, sodium, potassium, magnesium, calcium, aluminum, zinc, and iron. Example anions that can be present in the electrolyte include, but are not limited to, chloride, bromide, iodide, halide oxyanions, sulfur oxyanions, phosphorous oxyanions, and nitrogen oxyanions. The system 300 is configured to remove dissolved ionic species, such as those above, from water having an electrolyte concentration of up to the solubility limit of the ionic species in the desalination chamber. In certain embodiments, that electrolyte concentration can exceed 60 parts per thousand, and in further embodiments, the electrolyte concentration can exceed 80 parts per thousand. The system 300 is further configured to reduce the electrolyte concentration (e.g., salinity) of water being treated to about 5 parts per thousand, in further embodiments, to about 2 parts per thousand, or in still further embodiments, to about 0.5 parts per thousand.

As discussed above, the EDB unit 320a can operate as a flow battery in which unprocessed water is continuously supplied at inputs, and processed water is continuously extracted from outputs. The EDB unit 320a, or cell stack, which includes flow plates, electrodes, gaskets, and membranes, can either have a planar geometry (similar to typical fuel cells), or the stack can comprise tubular systems that are similar in aspect ratio to reverse osmosis desalination modules.

In certain embodiments, a first water tank 330 is connected to the water chambers 304, 306 through respective ports 332, 334. The first water tank 330 contains first-type water W1 having a first level of salinity (e.g., seawater). The pressure of the first-type water W1 can be controlled by a first pressure controller PC1, which can apply pressure on the first-type water W1. Alternatively, water pumps (not shown) that push the water from respective water tanks into the EDB unit 320a at a desired flow rate may be employed in lieu of, or in addition to, pressure controller PC1. During the charging cycle, the electrolyte (e.g., salt) concentration in chamber 306 increases and the electrolyte concentration in chamber 304 decreases. These are output from the EDB unit 320a to a switching unit 340a through ports 336, 338. Here switches S4A, S4B direct the output water either through the system to water tank 350, or the water is discharged through respective ports 342, 344. Because the four-chambered cell 320a continuously generates a desalinated stream of water, the switching unit 340a controls the respective salinated and desalinated stream outputs of the EDB unit 320a. For example, before the discharge cycle, the contents of chambers 304, 306 are replaced by new input water from tank 330. During the discharge cycle, the electrolyte concentration in 306 decreases and the electrolyte concentration in 304 increases—the opposite of what occurred in the previous half-cycle. Therefore, it is necessary to alternately collect water passing through chambers 304, 306 and into tank 350, changing over every half-cycle.

After passing through the switching unit 340a, the water in the second tank 350 is a second water type W2, that is different from the first water type W1 (e.g., water with a different level of salinity). For example, when desalinated water is collected in the second tank 350, the second-type water may be brackish water (e.g., salinity of less than about 10 parts per thousand). Alternatively, the salinated water may be collected in the second tank 350 such that W2 would have a higher salinity than W1. As with the first-type water, the pressure of the second-type water W2 can be controlled by a second pressure controller PC2, which can apply pressure on the second-type water W2 and/or water pumps may be employed. The water that is discharged from either port 344 or port 342 may be discharged from the system entirely or preserved in another storage tank for further use.

The set of electrical switches also determine the operational mode of the EDB unit 320a. A first set of electrical switches (S1A, S1B) controls electrical connection of the anode (318, 308) and the cathode (316, 302) of the energy storage system 300 to other electrical nodes. For clarity, the negative terminal of the EDB unit 320a is hereinafter referred to as the "anode" (318, 308), and the positive terminal as the "cathode" (316, 302), regardless of whether the EDB unit 320a is operating in charging or discharging mode. This is in view of the fact that both electrodes of a battery, including those described herein, can be either the anode or the cathode, depending on whether the battery is being charged or discharged.

During operation in the charging mode, the first set of electrical switches (S1A, S1B) can connect the anode (318, 308) to a negative output voltage node of a DC power supply unit, i.e., the power supply unit PS, and can connect the cathode (316, 302) to a positive output voltage node of the DC power supply unit, respectively. As used herein, "DC power supply unit" refers to a power supply unit that provides DC power, i.e., direct current power that does not change polarity as a function of time. Ions are released or taken up from the anode and/or anolyte (318, 308) and the cathode and/or catholyte (316, 302) to salinate the water in the chamber 306, and desalinate the water in chamber 304. The EDB unit 320a can be configured to have a cell potential of at least 0.8 V, or in certain embodiments at least 1.25 V.

During operation in the discharging mode, the first set of electrical switches (S1A, S1B) can connect the anode (318, 308) to a negative electrode of an electrical load, and can connect the cathode (316, 302) to a positive electrode of the electrical load, respectively. The EDB unit 320a desalinates water in chamber 306 and salinates water in chamber 304 while releasing stored energy as output power employing the anode (318, 308) as a negative output electrode and the cathode (316, 302) as a positive output electrode. As used herein, "DC output power" refers to output power provided in the form of direct current, i.e., output power that does not change polarity as a function of time.

The electrical load can include the power grid. A second set of switches (S2A, S2B) can connect the anode (318, 308) and the cathode (316, 302) of the EDB unit 320a to an inverter 390. The inverter 390 converts the DC output of the EDB unit 230a to an AC power output with a matching amplitude (i.e., the same amplitude as the amplitude of the AC voltage of the power grid) and a synchronous phase to feed into the power grid. Thus, the power released from the EDB unit 320a during the discharge mode can be transmitted to the power grid through the first and second sets of switches (S1A, S1B, S2A, S2B) and the inverter 390. The inverter 390 can be provided as part of the energy storage system 300, or can be provided externally on the side of the power grid. In one embodiment, the second set of switches (S2A, S2B) can be controlled by a power grid load monitor 392, which monitors the total power load on the power grid, and connects the second set of switches (S2A, S2B) with the inverter 390 at, or near, the peak power demand on the power grid.

In certain embodiments, the energy storage system 300 includes further optional water processing units 380. For example, tank 350 may be connected to an additional water-processing unit via ports 352, 354. The further processing units 380 may include one or more additional EDB units, represented by cell stack 320b. Each additional EDB unit 320b would include a corresponding switching unit represented by switching unit 340b. The one or more EDB units 320b and switching units 340b would operate as discussed above for EDB unit 320a and switching unit 340a. Other optional units may include one or more desalination units, represented by 360.

The one or more desalination units 360 can utilize a desalination technique other than an electrochemical battery such as reverse osmosis, capacitive deionization, electrodialysis, and thermal techniques. In one embodiment, the desalination unit 360 can perform a second or further desalination or salination process depending upon the operation of the EDB unit 320a. In further embodiments, even though the desalination units 360 are present in the system 300, they may not always be utilized even though the EDB unit 320a is operational.

The desalination units 360 can have a water port (herein referred to as a third water port 362) that is connected to water having a higher total dissolved solids (TDS) count (e.g., higher salinity), and another water port (herein referred to as a fourth water port 364) that is connected to water having a lower TDS count. For example, the water having the higher TDS count can be the second-type water W2 contained within the water tank 350 or water received from one or more optional EDB units 320b, and the water having the lower TDS count can be a third-type water W3 contained within a third water tank 370. For example, the TDS count of the third-type water W3 can be less than about 0.5 ppt, or at a level considered potable water, although a higher TDS count can also be employed. The pressure of the third-type water W3 in the third water tank 370 can be regulated by a third pressure controller PC3, which can apply pressure on the third-type water as needed. Alternatively, water pumps (not shown) that push the water from respective water tanks into the one or more desalination units 360 at a desired flow rate may be employed in lieu of, or in addition to, pressure controllers (PC2, PC3).

In certain embodiments, the direction of water flow between the second water tank 350 and the third water tank 370 is selected depending on whether the one or more desalination units 360 operate in a salination mode or in a desalination mode. The desalination units 360 can alternately operate in a desalination mode in which ions are removed from input water while consuming power supplied to the unit(s) 360, and in a salination mode in which ions are introduced to the input water while releasing energy stored in the unit(s) 360.

During operation of one or more optional water processing units 380, at least a fraction of the output power generated from the EDB unit 320a can be applied to those units 380, if necessary to provide power input for the operation. The routing of a fraction of the output power generated from the EDB unit 320a to the further water processing units 380 can be effected by a third set of electrical switches (S3A, S3B), which can be connected in a parallel connection with respect to the power grid and the second set of electrical switches (S2A, S2B). The power input required to operate the further units 380 is typically a small fraction of the power stored in the EDB unit 320a when a comparable volume of water passes through the EDB unit 320a and the additional units 380. Therefore, by routing a fraction of the energy released from the EDB unit 320a to the optional additional units 380 through the third set of switches (S3A, S3B), the one or more water processing units 380 can be adequately powered, and additional power can be released from the EDB unit 320a to the power grid during a discharge mode.

In addition, a process control device 385 can control the operational modes of the various components of the energy storage system 300. The process control device 385 can include a water flow control device as a component therein. The water flow control device controls the pressures of the first-type water W1, the second-type water W2, and/or the third-type water W3 through the first, second, and/or third pressure control devices (PC1, PC2, PC3) or through water pumps (not shown). The water flow control device may be configured to induce flow of water in different directions, as needed during charge and discharge modes, as well as for further salination/desalination processes.

Figure 4B:
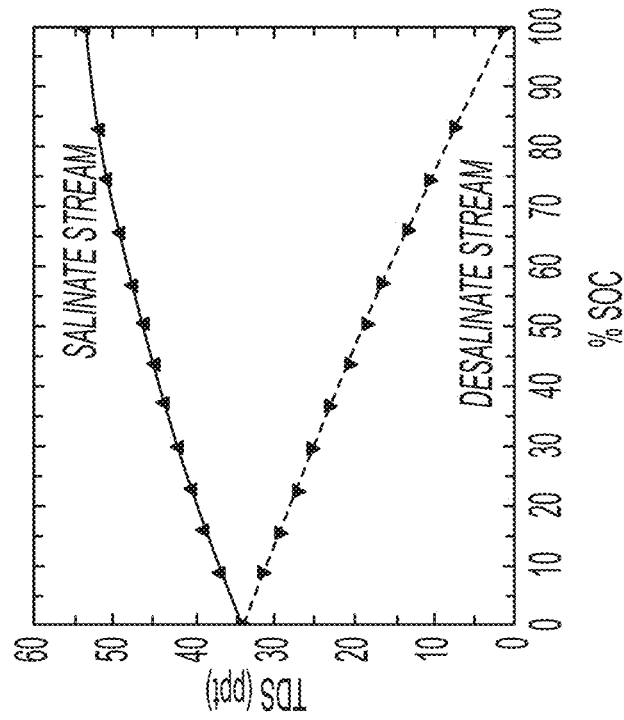
FIG. 4B is a graph of the respective reservoir salinities as a function of a cell's state of charge in accordance with certain embodiments.
Figure 4A:
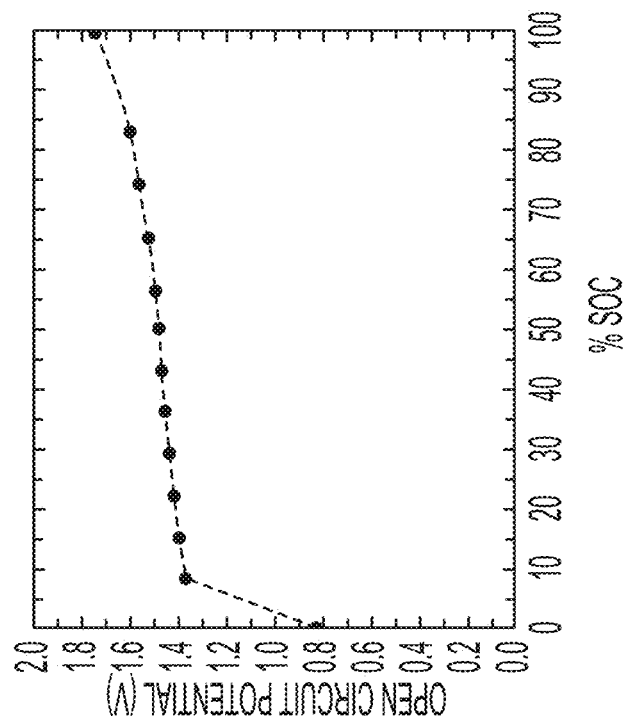
FIG. 4A is a graph of the open-circuit potential as a function of a cell's state of charge in accordance with certain embodiments.

Preliminary performance results for a cell, as described above with zinc chloride/zinc metal as the anolyte and (trimethylammoniomethyl)ferrocene chloride (FcNCl) as the catholyte, are provided in FIGS. 4A-B. In FIG. 4A, a high nominal cell potential (e.g., about 1.5 V) is shown that enables high round-trip energy efficiency. FIG. 4B shows respective salinities for the salinate and desalinate streams as a function of the cell's state of charge (SOC). As can be seen, extensive salt removal from seawater solutions is possible (e.g., 35 ppt to 1.4 ppt or 96% TDS removal). However, an 80% removal rate (e.g., 35 ppt to about 7 ppt) is more economical. Even hypersaline brines (e.g., about 100 ppt) that cannot be treated with reverse osmosis can be treated with the described four chambered cell.

As discussed above, the four-chambered electrodialytic battery produces desalinated water during both the charge and discharge half-cycles. The desalinated water can achieve a salinity of at or below 0.5 ppt, but this achievement is at the cost of lower round-trip energy efficiency. The reduction in efficiency occurs because the area specific resistance (ASR) of the battery increases sharply as the electrolyte content of the desalinate stream drops. However, the four-chambered cell could be operated in a third mode—as an electrodialyzer. If the anolyte, or another redox carrier, is circulated around the catholyte and anolyte chambers, a cell as described in connection with FIGS. 1A-B can operate as an electrodialyzer during times when the cell does not need to be charged or discharged. Water at an intermediate salinity (e.g., 10 ppt) produced by the device operating in an electrodialysis mode could be reintroduced to the system and further desalinated to 1.2 ppt, or even to or below 0.5 ppt (i.e., potable). The three alternative operating modes are described further below in connection with FIGS. 5A-C.

Figure 5A:
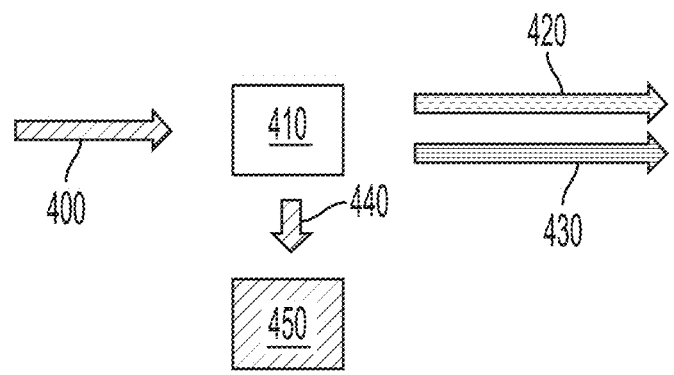
FIG. 5A illustrates the discharge operating mode for a four chambered electrodialytic battery in accordance with certain embodiments.

FIG. 5A illustrates a discharge operating mode (i.e., a first half-cycle) of a four chambered electrodialytic battery. Water, such as seawater (e.g., ~35 ppt salinity) is input 400 to the system 410. The system produces electricity, which is sent to/stored at the grid 420, and a salinated water stream 430 (e.g., ~60 ppt salinity), which is disposed or further processed. The system 410 also produces a desalinated water stream having an intermediate salinity 440 (e.g., ~10 ppt salinity), which is stored, for example, in a holding tank 450.

Figure 5B:
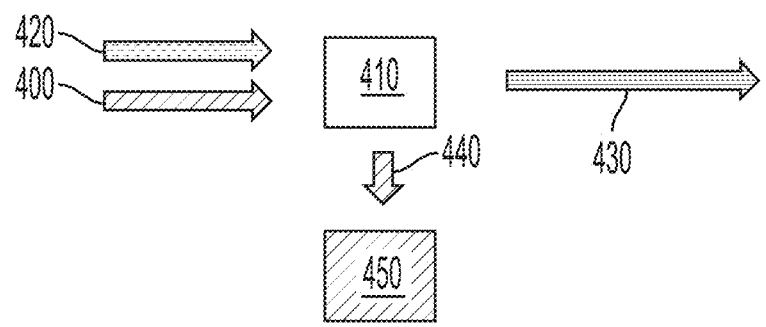
FIG. 5B illustrates the charge operating mode for a four chambered electrodialytic battery in accordance with certain embodiments.

FIG. 5B illustrates the second half-cycle, a charge mode of the four chambered electrodialytic battery of FIG. 5A. Water, such as seawater (e.g., ~35 ppt salinity) is input 400 along with electricity from the grid 420 to the system 410. The system produces a salinated water stream 430 (e.g., ~60 ppt salinity), which is disposed or further processed. The system 410 also produces a desalinated water stream having an intermediate salinity 440 (e.g., ~10 ppt salinity), which is stored, for example, in a holding tank 450. The cell charge and discharge modes utilize two redox active materials as discussed above in connection with FIGS. 2A-B. A system that operates in the charge and discharge modes can also, optionally, be operated in an electrodialyzer mode without much additional expense.

Figure 5C:
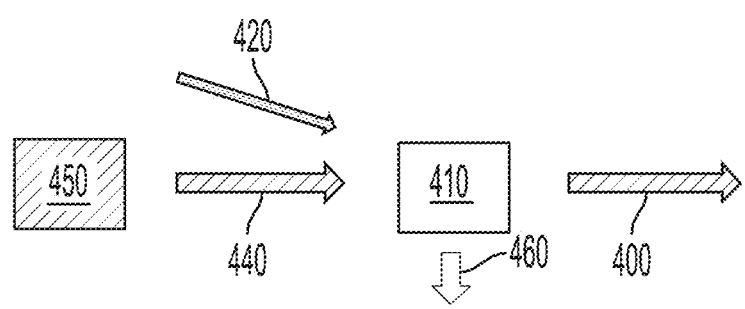
FIG. 5C illustrates an electrodialysis operating mode for a four chambered electrodialytic battery in accordance with certain embodiments.

FIG. 5C illustrates a third electrodialysis operating mode of the four chambered electrodialytic cell of FIGS. 5A-B that is utilized when the cell is not in charge or discharge mode. Cell operation differs however, in that in electrodialysis mode, only one redox active material is shuttled, similar to that discussed in connection with FIGS. 1A-B. Thus, while a cell configured to operate in charge and discharge modes can be readily modified for an electrodialysis mode, the opposite is more complicated and cost intensive due to at least a large increase in the amount of materials.

In electrodialysis mode, water from the holding tank 450 having an intermediate salinity 440 (e.g., ~10 ppt salinity) is input along with electricity from the grid 420 to the system 410. The input water could be the desalinated output from one or both of the charge and discharge modes described above. The system produces a salinated water stream 400 (e.g., ~35 ppt salinity) similar to the input water for the charge/discharge modes, which is disposed and/or recycled. The system 410 also produces a desalinated water stream having an even lower salinity 460 (e.g., ~0.5 ppt salinity). For example, the desalinated output stream from the electrodialysis mode may be potable and provided to consumers as fresh water. Notably, the electrodialysis mode does not store energy.

In each mode, feed water is continually being split into salinate and desalinate streams. The salinities of the various feed, salinate, and desalinate solutions can be independently varied based on flow rate, operating current density, and many other factors in various embodiments. In further embodiments, the electrodialytic battery can produce desalinated water at or below 0.5 ppt during charge and/or discharge modes. The above-described modes enable the electrodialytic battery to produce fresh water using existing hardware and mitigate and/or remove the need for a separate, secondary desalination system (e.g., a secondary reverse osmosis system).

The electrodialysis mode of FIG. 5C can be utilized in several further embodiments. The cell can also regenerate a concentrated aqueous solution of a solute (i.e., a liquid desiccant), which when dissolved in water at a sufficiently high concentration, is capable of removing water from a different material that the solution is in contact with. For example, such a four-chambered cell in various systems may be applied to various processes involving dehydration and/or dessication including, but not limited to, aqueous inkjet inks, nonaqueous liquids that contain dissolved water, and solid materials that contain water. Example embodiments may be directed to various water removal functions including dehumidification of air, concentration of aqueous liquids, drying of nonaqueous liquids, and dehydration of solids.

Figure 5D:
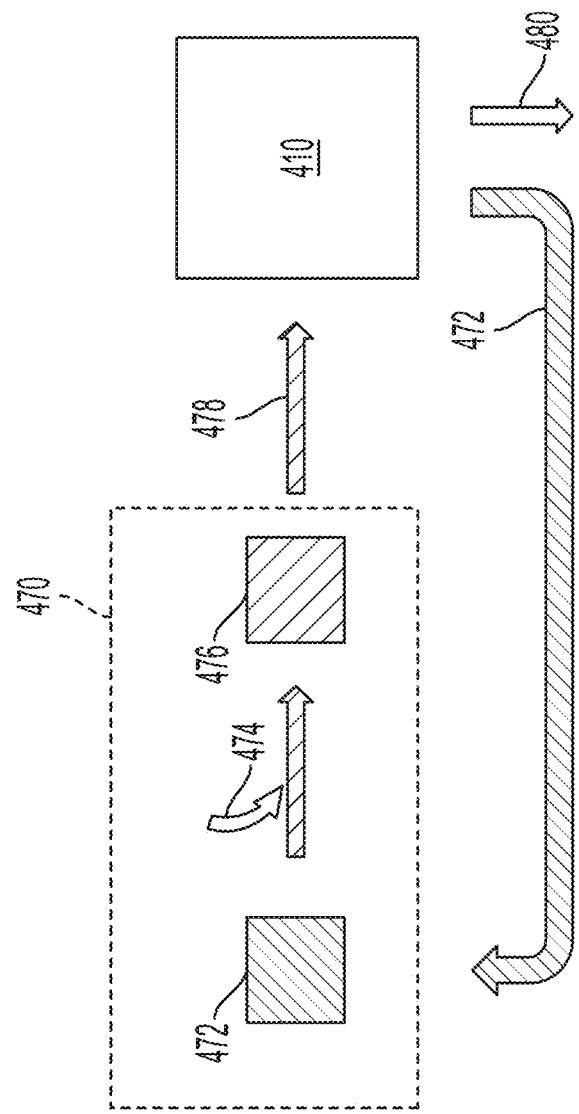
FIG. 5D illustrates a dehumidification operating mode for a four-chambered electrodialytic battery in accordance with certain embodiments.

An example embodiment directed to air conditioning is described further in connection with FIG. 5D. Liquid desiccants have been explored for energy efficient air conditioning of indoor air. In order to produce indoor air at a comfortable temperature and humidity (e.g., as defined by the American Society of Heating, Refrigerating and Air-Conditioning Engineers), air conditioners may need to overcool intake air in order to reduce humidity to acceptable levels. The overcooled air is then reheated to the desired temperature using extra energy in the duplicative process.

Alternatively, a smaller amount of cooling of the intake air can be combined with a different dehumidification process in order to produced conditioned air. One approach uses liquid desiccant air conditioning to achieve the dehumidification. For example, water is absorbed, sometime through a membrane, into a liquid desiccant medium that has a high affinity for water vapor. Examples of such liquid desiccants include concentrated aqueous solutions of ionic salts such as calcium chloride, lithium chloride, and lithium bromide. After the desiccant has absorbed water vapor from the air, the desiccant is more diluted than prior to the absorption and must be reconcentrated (i.e., regenerated) to at or about the original concentration, while removing the extra water that absorbed from the intake air, in order to be used again.

While some approaches evaporate the excess water by heating the diluted solution, these approaches are inefficient due to the rate of evaporation slowing as the salt content of the solution and relative humidity increases. Moreover, the liquid desiccant would then need to be cooled prior to beginning a new process to avoid undesirable heating of the air being conditioned. As discussed above in connection with FIGS. 1A-B, the four-chambered cell described herein performs energy-efficient electrodialysis in a non-thermal process. The four-chambered cell operating in an electrodialysis mode can reconcentrate a diluted liquid desiccant solution by separating a concentrated liquid desiccant stream from the water absorbed from the intake air.

FIG. 5D illustrates a system incorporating a four-chambered cell in a dehumidification process. A dehumidification module 470 takes input air 474 (e.g., air to be cooled) and exposes the input air 474 to a liquid desiccant having a first concentration (e.g., 40% lithium chloride) 472. The liquid desiccant 472 removes water vapor from the input air to dehumidify the air. The dehumidified air is then cooled and/or further processed and output from the module 470. Upon dehumidification of the air, the liquid desiccant absorbs the water vapor from the air thereby diluting the liquid desiccant to a second concentration (e.g., 35% lithium chloride) 476. The diluted liquid desiccant 476 is then input 478 into a system 410 including a four-chambered cell, as described above in connection with FIG. 3. For example, the dehumidification module 470 would replace the first water tank 330 and input 478 would replace ports 332, 334. The diluted liquid desiccant 476 would be input to chambers 304, 306 for treatment.

The four-chambered cell is then used to reconcentrate the liquid desiccant, which is typically a concentrated solution of inorganic salts (e.g., lithium chloride). In certain embodiments, to reduce losses through water crossover from the desalinate stream to the salinate stream, the system 410 may include one or more additional, different four-chambered cells (e.g., represented by cell stack 320b) in which the salinity is decreased in several stages to a desired level. Embodiments directed to regeneration of a liquid desiccant utilize a single redox shuttle for energy efficiency. In some embodiments, the redox shuttle may also include some amount of dissolved inorganic salt that acts as a supporting electrolyte while keeping all four chambers of the cell stack 320b osmotically balanced. In certain embodiments, the dissolved inorganic salt is the same material as in the liquid desiccant to be regenerated. Like embodiments discussed above, the system can operate at negligible overpotential. The single redox shuttle is also operated at a concentration that reduces and/or minimizes net water crossover to or from both the salinate and desalinate streams. An example redox shuttle is BTMAP-Fc, discussed above, as it has a very high solubility in water that can closely match, or match, the concentrations of the desiccant streams (e.g., up to about 1.9 molar or ~10 molal), or can remain dissolved in solutions that contain a large concentration of dissolved inorganic salt that acts as a supporting electrolyte while keeping all four chambers of the cell stack 320b osmotically balanced.

The system 410 outputs a regenerated liquid desiccant stream 472 (e.g., a salinate stream) having about the same, or the same, concentration as the first concentration (e.g., 40% lithium chloride). This stream is then fed back into the dehumidification module 470. Similar to FIG. 5C, the system 410 also outputs a desalinate stream 480. The desalinate stream will still include at least a small amount of dissolved salt which could be discharged as waste. Alternatively, the desalinate stream 480 can be reused as gray water if the salt is cheap enough to discard, thereby incurring an operating cost. In further embodiments, the desalinate stream 480 may be reconcentrated using techniques other than electrodialysis, such as membrane pervaporation, and fed back into an intermediate processing stage of the system 410. In HVAC embodiments, reconcentration may be performed using an evaporative method to enable additional sensible cooling when integrated into a full HVAC system. As discussed above, the dehumidification process, including regeneration of the liquid desiccant, is performed at a low specific energy consumption through incorporation of the four-chambered desalination cell.

In summary, the above-described four (or more) chambered desalination cell may use either one redox-active species that is circulated around the anode and cathode, where it undergoes faradaic reactions at both electrodes, or two redox-active species that are each confined to the anode or cathode respectively. Various embodiments utilizing such a cell can perform electrodialysis at low specific energy consumption, continuously produce desalinated and salinated water optionally coupled to electrical energy storage, whether during the charge or discharge half-cycle, and can enable a device that couples water desalination and energy storage to be reversibly operated in a mode that can perform electrodialysis at low specific energy consumption.

The above-described features are discussed in further detail with respect to the following examples.

Example 1

An energy-efficient redox-assisted electrodialysis system was constructed consistent with that shown in FIG. 1B. The anode and cathode consisted of three sheets of porous carbon fiber paper (SGL 39AA) pressed onto pyrosealed graphite blocks with serpentine flow channels (Entegris) and separated from the central desalinate/salinate chambers by Viton gaskets. The anion exchange membrane was Fumasep FAS-15 and the cation exchange membranes were Nafion 212.

Figure 6A:
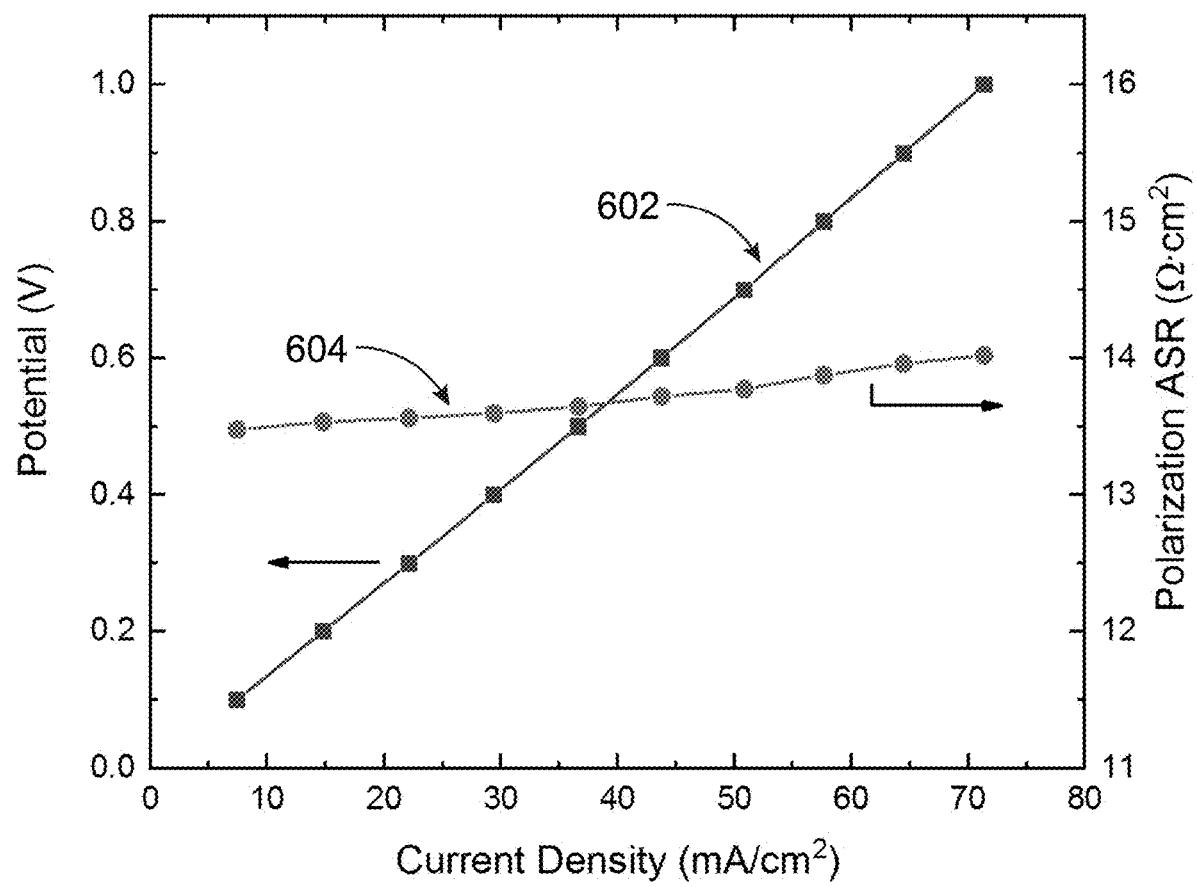
FIGS. 6A-B are graphs showing performance metrics of a four-chambered electrodialysis system utilizing ferrocyanide/ferricyanide as a redox shuttle.
Figure 6B:
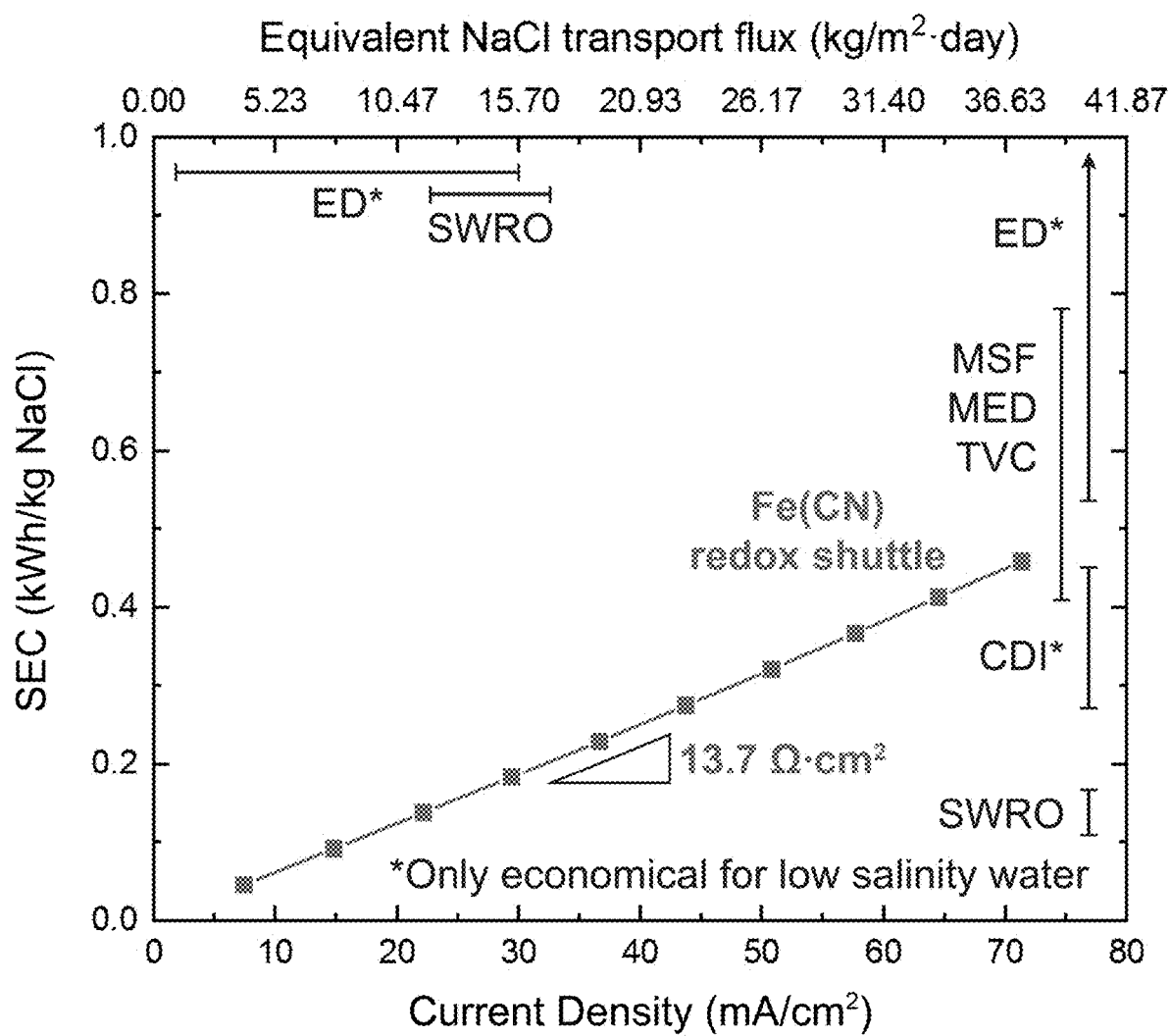

When a solution of 0.1 M $Na_3Fe(CN)_6$, 0.1 M $Na_4Fe(CN)_6$, and 1% NaCl (50 mL) was flowed past the anode/cathode and 0.6 M NaCl was in both the salinate and desalinate chambers (50 mL each), the high-frequency ASR of the system was measured at 11.5 $\Omega \cdot cm^2$ and the polarization ASR was 13.7 $\Omega \cdot cm^2$. FIG. 6A shows the relationship between the applied potential and the resulting current density 602 (square points, left axis), as well as the system polarization ASR as a function of current density 604 (round points, right axis). FIG. 6B shows the relationship between the specific energy consumption of the system as a function of current density (or NaCl transport rate). The respective experimental data points are shown as squares. The current density is directly proportional to the salt transport rate. Depending on how the cell is operated, the specific energy consumption is lower than that of conventional electrodialysis at current densities below about 80 $mA/cm^2$, and lower than that of seawater reverse osmosis below about 20 $mA/cm^2$, though the specific energy consumption for reverse osmosis will rise sharply with increased intake salinity.

Figure 6C:
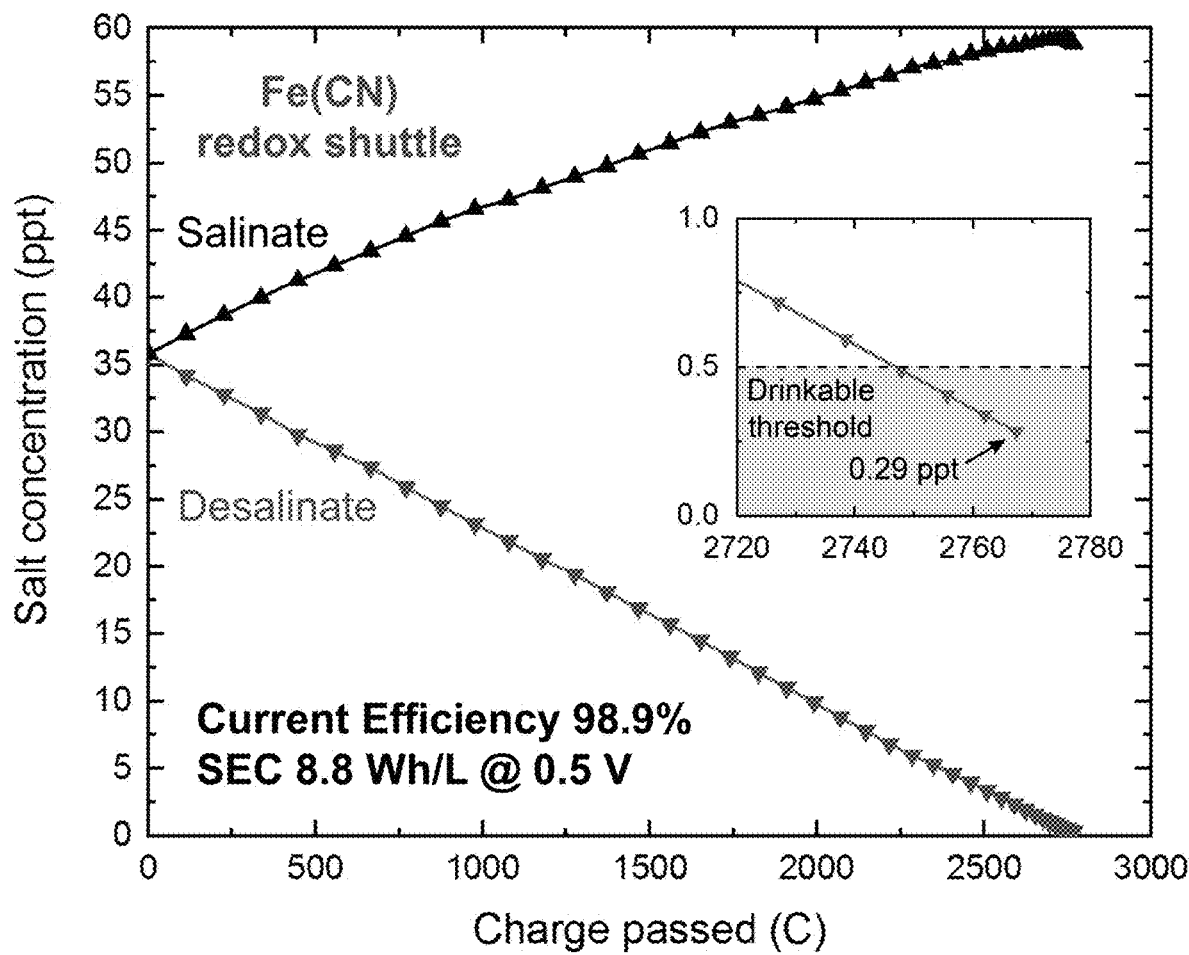
FIG. 6C is a graph showing salt concentration as a function of charge passed in the four-chambered electrodialysis system of FIGS. 6A-B.
Figure 6D:
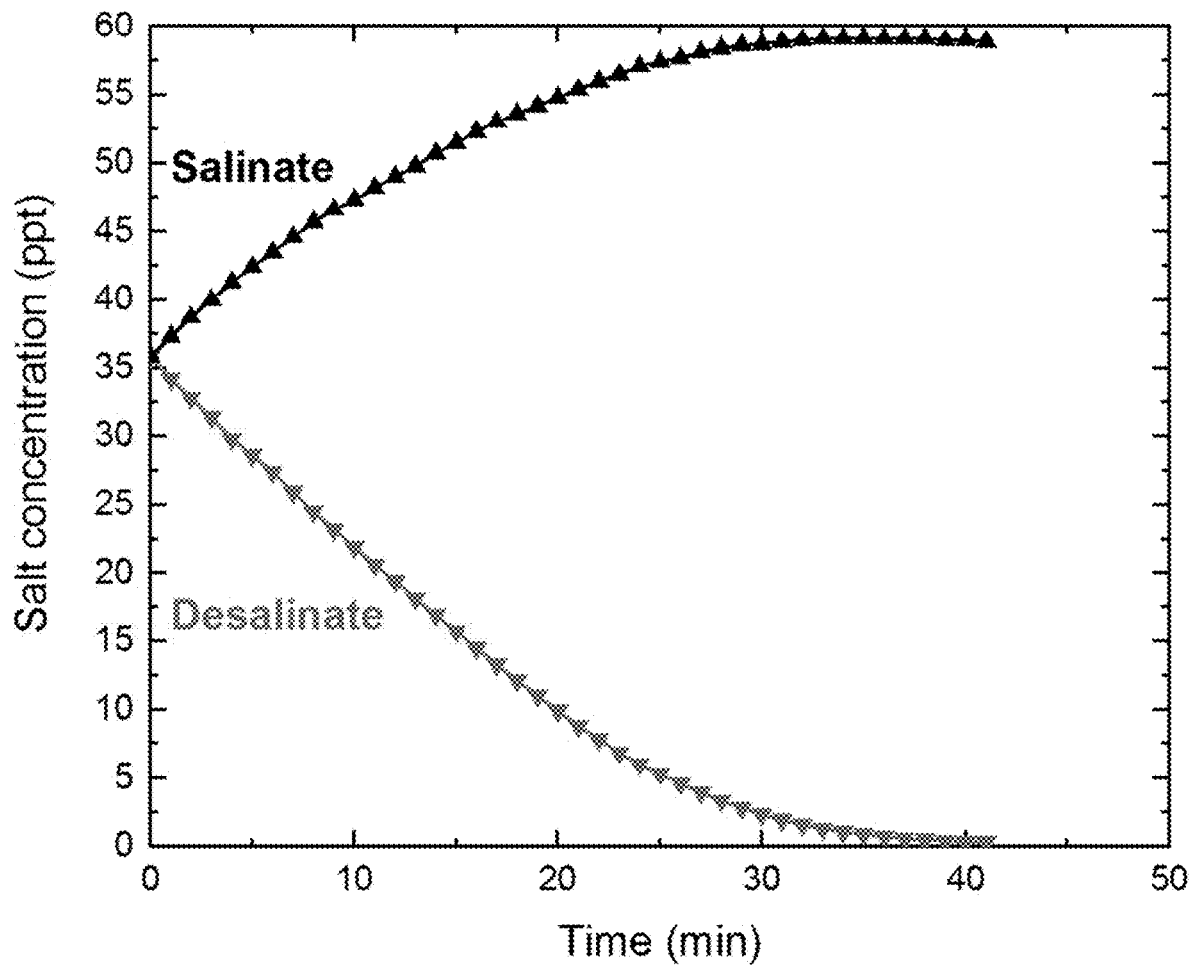
FIG. 6D is a graph showing salt concentration as a function of time in the four-chambered electrodialysis system of FIGS. 6A-B.

If necessary, the cell can produce larger volumes of desalinate at a higher specific energy consumption. Improvements to the specific energy consumption of the cell are expected as a result of lowered ASR. With this system, direct production of water at a drinkable salinity (e.g., <0.5 ppt NaCl) is possible in a single stage from seawater (e.g., 35 ppt NaCl). A constant voltage of 0.5 V was applied to the cell, causing the water in the salinate chamber to increase in salt concentration and the water in the desalinate chamber to decrease in salt concentration. The salt concentration can be decreased to at or below a threshold concentration of drinkable salinity. The evolution of the salt concentration of the water in the salinate and desalinate chambers is shown in FIG. 6C as a function of charge passed and in FIG. 6D as a function of time. At the conclusion of the experiment, the water in the desalinate chamber had a NaCl concentration of 0.3 ppt, well below the threshold for drinkable salinity.

To compare the redox-assisted cell with conventional electrodialysis, the specific energy consumption was modeled for a conventional electrodialysis process run in the same cell as described above. FIG. 7A shows the resulting operating potential in solid lines and specific energy consumption in dashed lines for the respective conventional and redox-assisted electrodialysis systems in the cell stack. The cell ASR is expected to be similar between conventional and redox-assisted electrodialysis because the ASR is dominated by the membrane resistance, the ionic conductivity of the electrolytes in the intervening chambers, and the intermembrane spacing. In general, the contribution of the additional potential to specific energy consumption for conventional electrodialysis may be reduced by a factor of n for every n pairs of salinate/desalinate chambers between each anode and cathode. But, it can never be brought to zero. FIG. 7B provides a comparison of the relative specific energy consumption of redox-assisted and conventional electrodialysis for a cell having one pair of salinate/desalinate chambers and twenty-five pairs of chambers per anode and cathode. In certain embodiments such as the cell stack described in this example, n=1, but n=25 is typical in conventional electrodialysis.

Example 2

In a further embodiment, BTMAP-Fc was employed in place of Fe(CN) as the redox shuttle. The use of BTMAP-Fc is expected to avoid the formation of insoluble solids that will be formed from the reaction of Fe(CN) with certain metal ions. A second energy-efficient redox-assisted electrodialysis system was constructed consistent with that shown in FIG. 1B. The anode and cathode consisted of three sheets of porous carbon fiber paper (SGL 39AA) pressed onto pyrosealed graphite blocks with serpentine flow channels (Entegris) and separated from the central desalinate/salinate chambers by Viton gaskets. The anion exchange membranes were Fumasep FAS-30 and the cation exchange membrane was Fumasep E630.

Figure 14A:
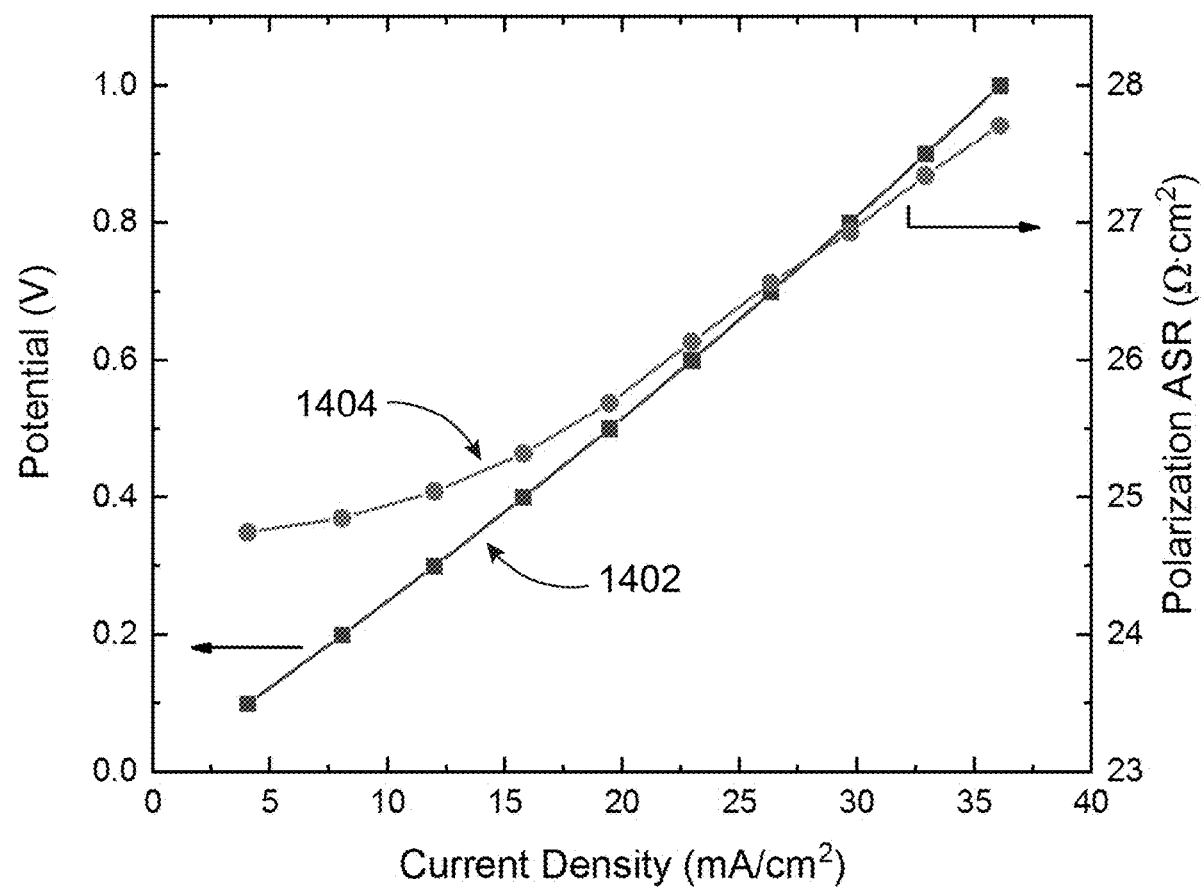
FIGS. 14A-B are graphs showing performance metrics of a four-chambered electrodialysis system utilizing BTMAP-Fc as a redox shuttle.
Figure 14B:
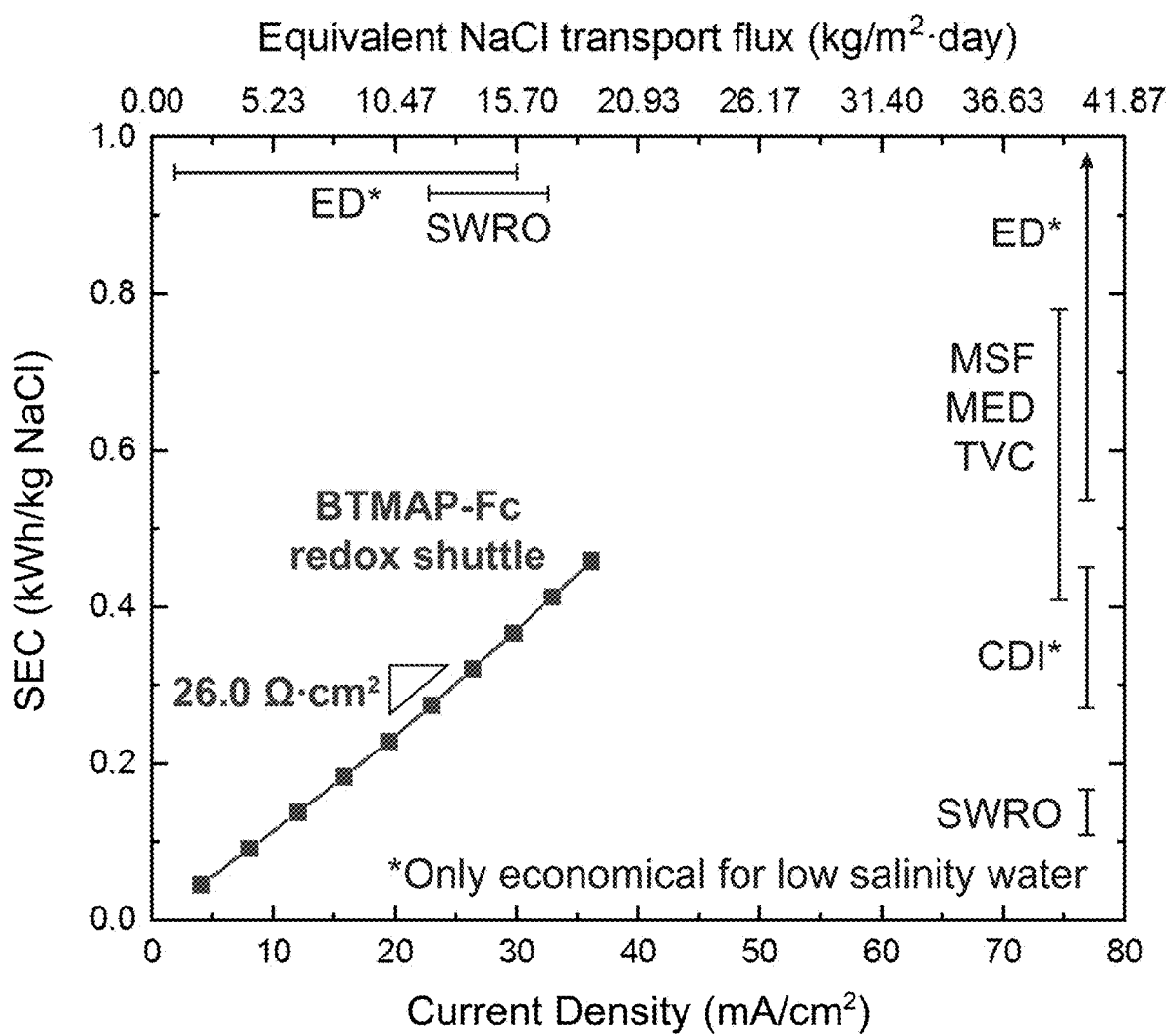
Figure 14C:
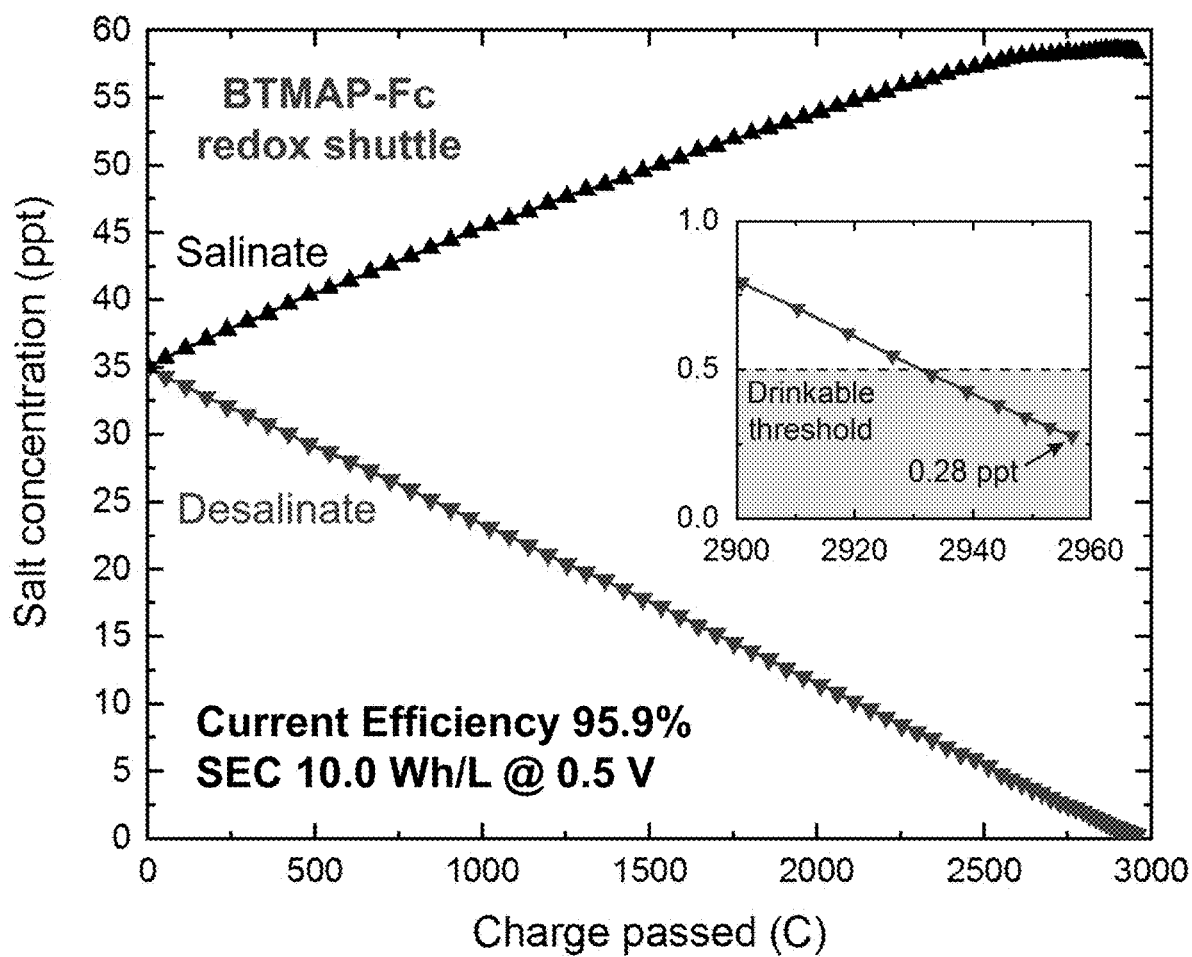
FIG. 14C is a graph showing salt concentration as a function of charge passed in the four-chambered electrodialysis system of FIGS. 14A-B.
Figure 14D:
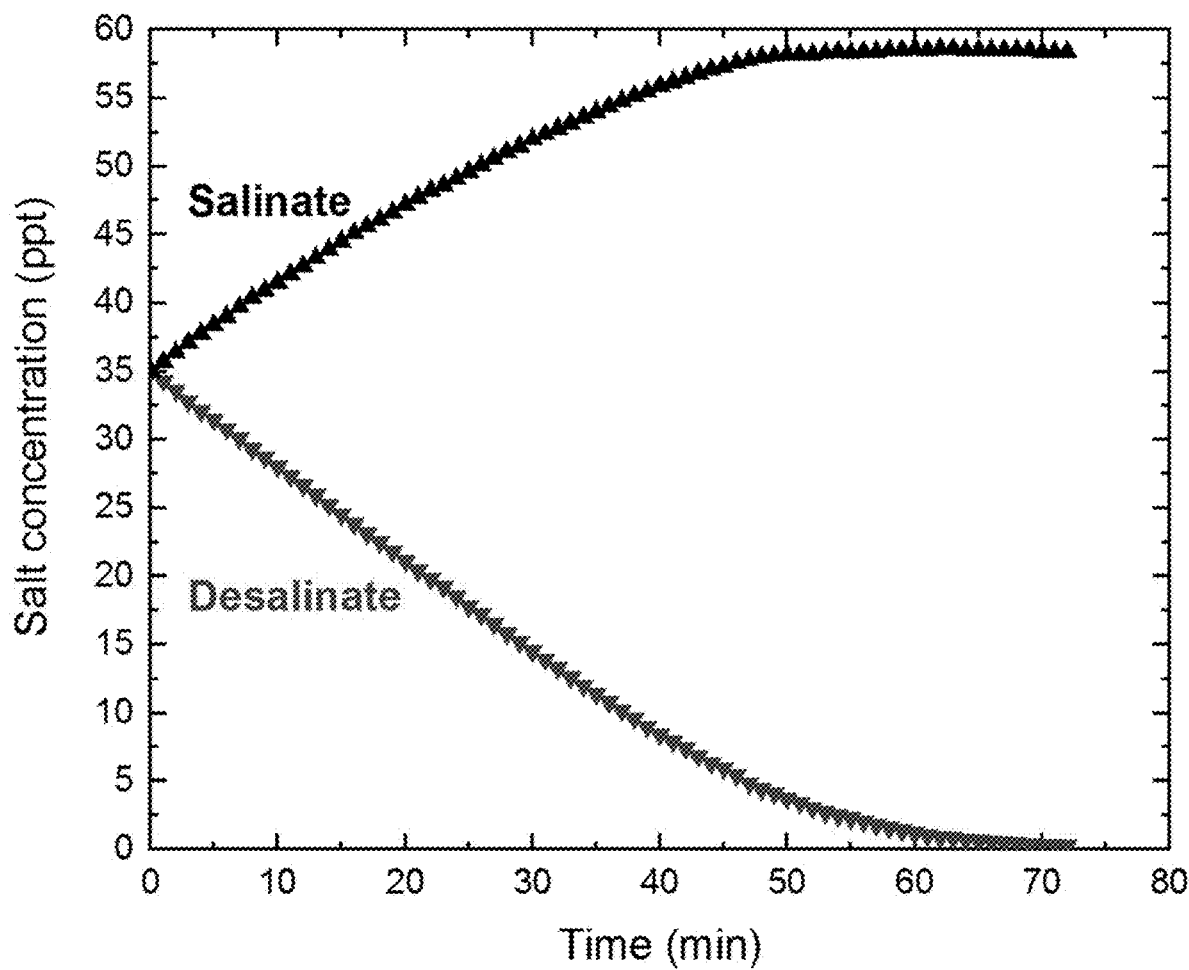
FIG. 14D is a graph showing salt concentration as a function of time in the four-chambered electrodialysis system of FIGS. 14A-B.

When a solution comprising 0.05 M BTMAP-Fc, 0.05 MBTMAP-Fc$^+$, and 1% NaCl (50 mL) was flowed past the anode/cathode and 0.6 M NaCl was in both the salinate and desalinate chambers (50 mL each), the high-frequency ASR of the system was measured at 17.9 $\Omega \cdot cm^2$, and the polarization ASR was 26.0 $\Omega \cdot cm^2$. FIG. 14A shows the relationship between the applied potential and the resulting current density 1402 (square points, left axis) as well as the system polarization ASR as a function of current density 1404 (round points, right axis). FIG. 14B shows the relationship between the specific energy consumption of the system as a function of current density (or NaCl transport rate). The respective experimental data points are shown as squares. The current density is directly proportional to the salt transport rate. Depending on how the cell is operated, the specific energy consumption is lower than that of conventional electrodialysis at current densities below about 40 $mA/cm^2$, and lower than that of reverse osmosis below about 10 $mA/cm^2$, though the specific energy consumption for reverse osmosis will rise sharply with increased intake salinity. If necessary, the cell can produce larger volumes of desalinate at a higher specific energy consumption. Improvements to the specific energy consumption of the cell are expected as a result of lowered ASR. With this system, direct production of water at a drinkable salinity (<0.5 ppt NaCl) is possible in a single stage from seawater (e.g., 35 ppt NaCl). A constant voltage of 0.5 V was applied to the cell, causing the water in the salinate chamber to increase in salt concentration and the water in the desalinate chamber to decrease in salt concentration. The evolution of the salt concentration of the water in the salinate and desalinate chambers is shown in FIG. 14C as a function of charge passed and in FIG. 14D as a function of time. At the conclusion of the experiment, the water in the desalinate chamber had a NaCl concentration of 0.3 ppt, well below the threshold for drinkable salinity.

In yet another embodiment, several stages of desalination can be performed, in which the redox-active reactant, optionally with a supporting electrolyte comprising the salt in the salinate/desalinate, is employed at an appropriate concentration relative to the salt concentration in the salinate/desalinate in order to minimize water transport in each stage. This reduces or minimizes energy inefficiencies arising from water transport from the salinate/desalinate chambers to or from the anolyte/catholyte chambers.

Example 3

Figure 8A:
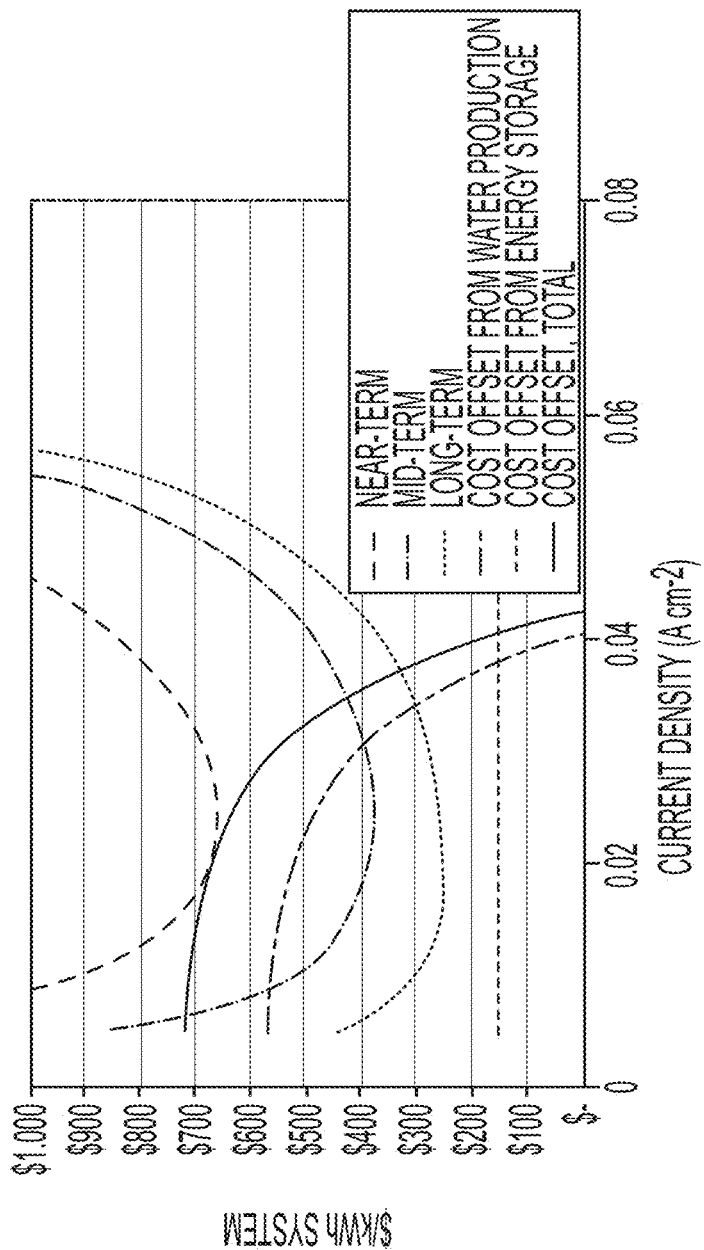
FIGS. 8A-D are graphs of system costs, revenues, and performance metrics for a four-chambered electrodialytic battery using conservative pricing for water and electricity.
Figure 8B:
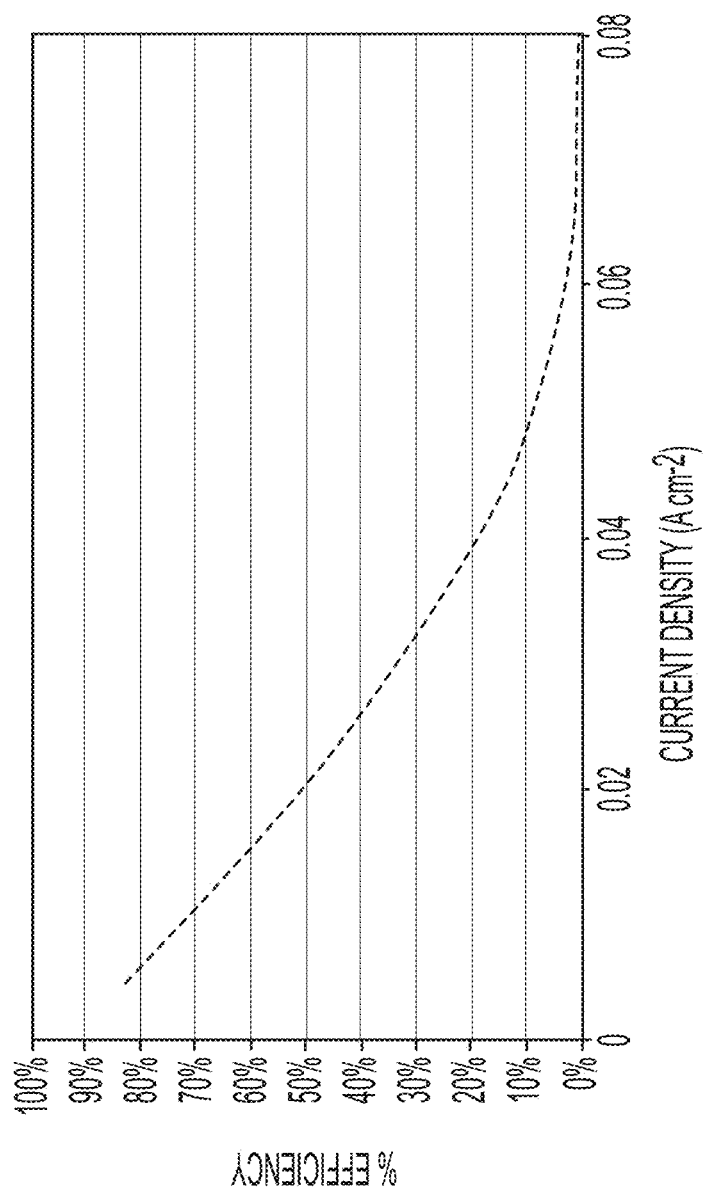
Figure 8D:
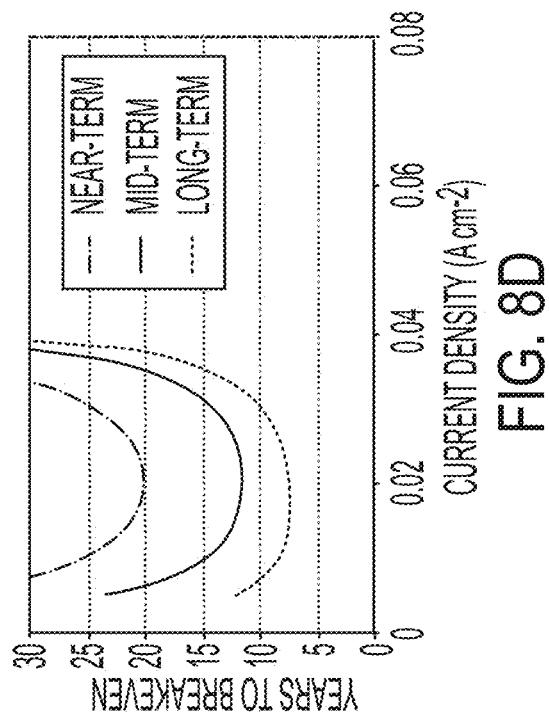
Figure 8C:
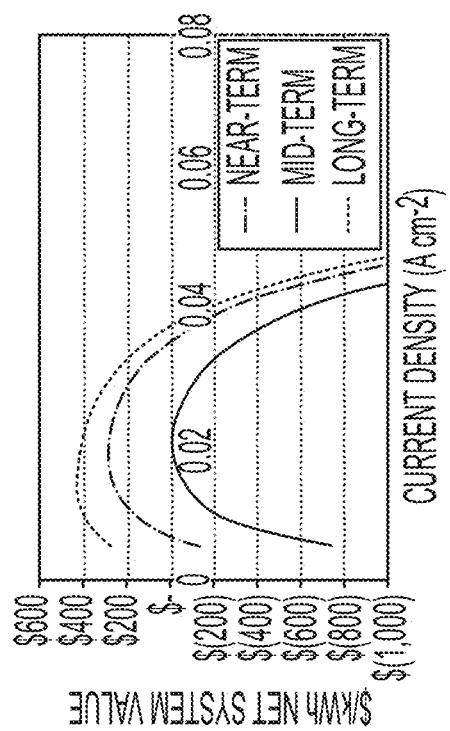

To determine what combination of cell size and current density (and therefore water output) make the most economic sense for a given battery capacity, a sophisticated bottom-up cost model was constructed for a Zn|FcNCl battery consistent with the design of FIGS. 2A-B, with the experimentally obtained polarization ASR value reported in the example above as an input. A 1 MW, 12 MWh (delivered) system would be able to produce 2000 $m^3$ of brackish water per day at a salinity of about 10 ppt at an optimized current density of 17.5 $mA/cm^2$. The various performance metrics of this electrodialytic battery system are shown in FIGS. 8A-D. FIG. 8A shows the system costs and revenues for the above-described four chambered electrodialytic battery using the described conservative pricing. Near-term (e.g., present), mid-term (e.g., 5 years), and long-term (e.g. 10 years) refer to the price projections for the various components of the cell stack. FIG. 8B illustrates the round-trip energy efficiency performance including estimated shunt and pumping losses, while FIG. 8C shows the net system value (i.e., revenues less system costs) for the near-, mid-, and long-term. Also, FIG. 8D provides the projected breakeven time, which decreases over the life of the system. As can be seen, the corresponding round-trip energy efficiency is 55% and the overall specific energy consumption for the desalination is 0.196 kWh/kg NaCl (or 4.91 $kWh/m^3$ of 10 ppt desalinate produced).

The minimum breakeven time would be 7.4 years at an internal rate of return (IRR) of 13.5%, assuming a conservative price of \$0.04/kWh for electricity, \$0.81/$m^3$ for fully desalinated water, and \$0.17/$m^3$ as the additional cost to treat the brackish water output. The Department of Energy cost target for energy storage (\$150/kWh) is taken as a first approximation for the "value" of energy storage.

However, the economic case becomes even more compelling in arid parts of the world where energy is readily available in the form of solar insolation or fossil fuels, and there is high demand for fresh water. Such places include Saudi Arabia and other countries around the Persian Gulf. In those areas, the price of fresh water is higher, around \$1.35/$m^3$, which reflects increased demand and increased difficulty in desalinating the highly saline waters of the Persian Gulf, which is typically about 45 ppt (as compared with 35 ppt for typical seawater). Also, lower prices of about \$0.02/kWh for input electricity are possible for that region of the world. The comparable system costs, revenues, and relevant performance metrics are shown in FIGS. 9A-D.

Figure 9A:
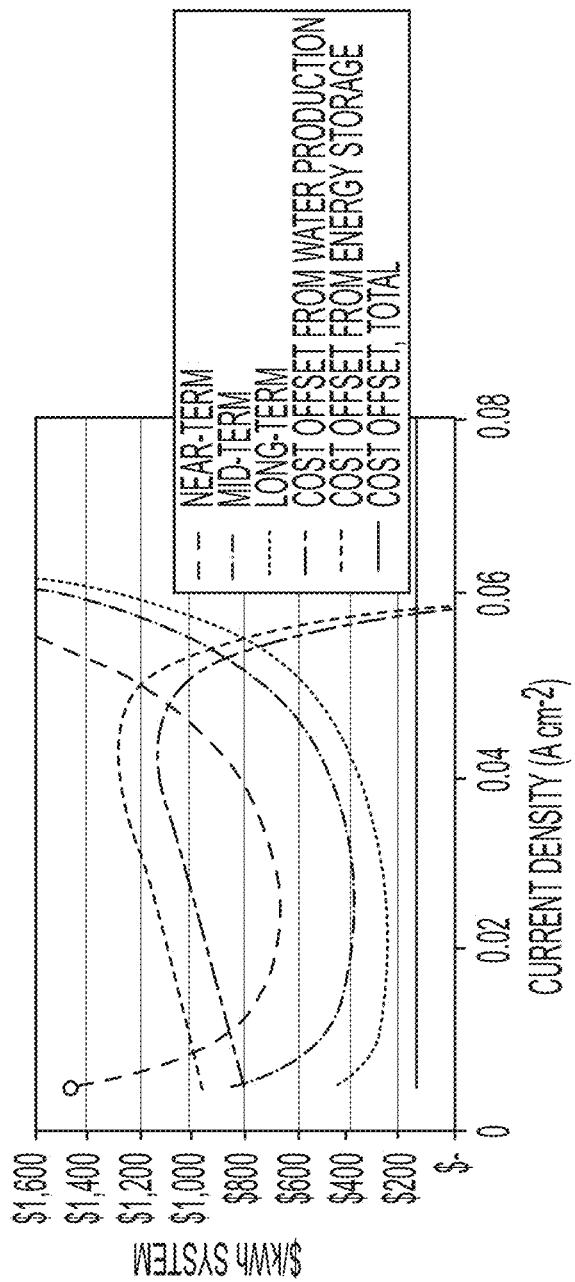
Figure 9D:
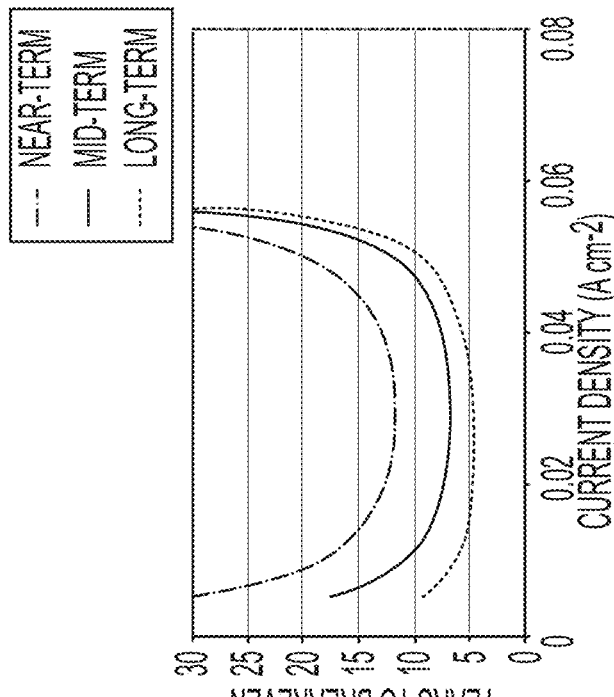
Figure 9C:
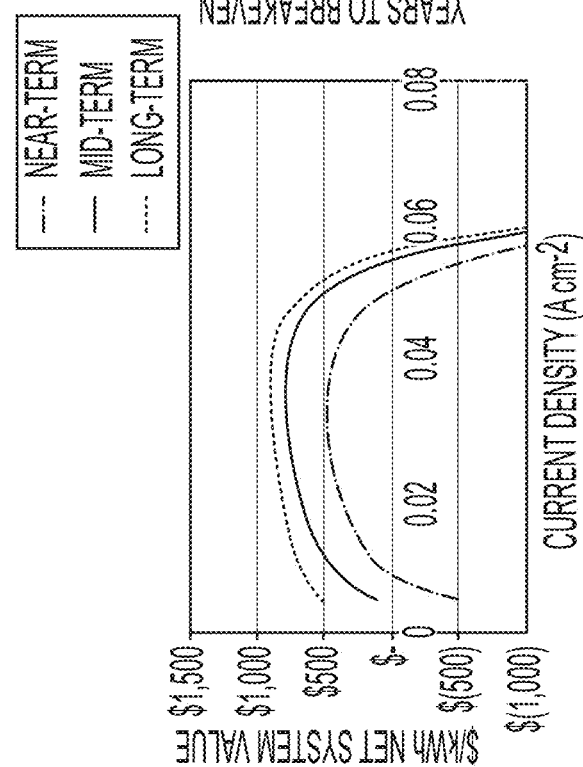

Near-term (e.g., present), mid-term (e.g., 5 years), and long-term (e.g. 10 years) again refer to the price projections for the various components of the cell stack. FIG. 9A shows the system costs and revenues for the above-described four chambered electrodialytic battery using optimistic, but attainable pricing for the Persian Gulf area. FIG. 9B illustrates the round-trip energy efficiency performance including estimated shunt and pumping losses, while FIG. 9C shows the net system value (i.e., revenues less system costs) for the near-, mid-, and long-term. Also, FIG. 9D provides the projected breakeven time, which decreases over the life of the system. In this scenario, recalculated for another 1 MW, 12 MWh system, the optimum current density would be 25 $mA/cm^2$ at a round-trip energy efficiency of 42%, producing 1600 $m^3$/day of desalinate at 10 ppt. The specific energy consumption is projected to be 0.293 kWh/kg NaCl removed, or 10.26 $kWh/m^3$ of desalinate produced. The minimum breakeven time would be 4.6 years at an IRR of 21.7%.

Figure 10:
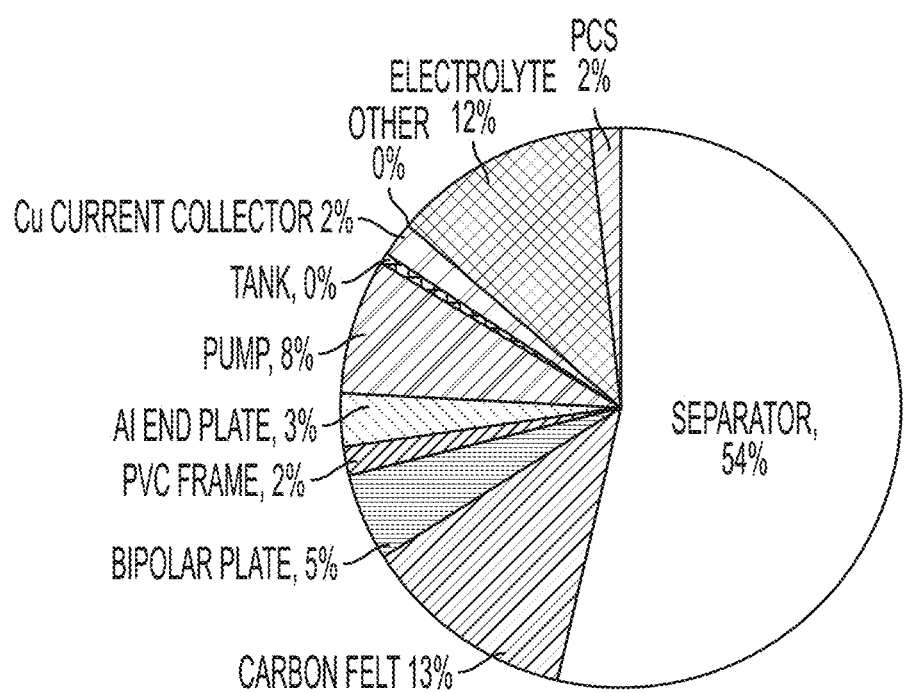
FIG. 10 is a graph of component costs for a four-chambered cell in accordance with certain embodiments.

In either scenario, a breakdown of component costs, as shown in FIG. 10, shows that the cost is dominated by the various ion-selective membranes in the cell. The IRR in both scenarios is heavily dependent on the polarization ASR of the cell stack, which is based herein on an unoptimized experimental result. Further improvements to the ASR can be made by refining the cell design to reduce and/or minimize the inter-membrane separation, which currently accounts for the bulk of the system ASR. Since the operating expenses are largely dependent upon the lifetimes of the various membranes, ligands and/or surface treatments may be employed. For example, the crossover of $Zn^{2-}$ ions across an AEM and into a seawater chamber could cause anolyte loss. Since zinc is inexpensive and easily removed downstream, some membrane crossover could be tolerable with periodic additions of zinc for rebalancing. However, if the measured crossover rate is unacceptably high (i.e., too expensive), ligands and/or surface treatments may be added to the membranes (on the catholyte side as well) to reduce crossover. Based upon this analysis, lifetime of the system is expected to be on par with that of conventional electrodialysis (e.g., about ten years), or longer, as the membranes are not exposed to extreme pH from water splitting or chorine evolution. The use of such electrochemical desalination flow batteries is further described below.

Figure 11:
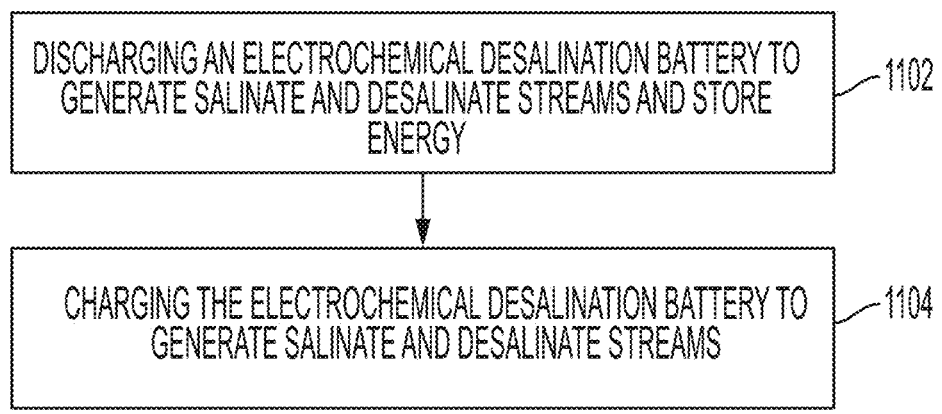
FIGS. 11-13 are flow diagrams of methods in accordance with certain embodiments.

FIG. 11 illustrates an example method for using a four chambered electrochemical desalination flow battery, as described above, in an energy storage system. More specifically, the device operates as a desalination flow battery to store electricity and desalinate water in an alternating cycle. Since the cycles alternate, either the charge cycle or the discharge cycle could be considered "first." In the example of FIG. 11, the battery is discharged to generate a saline output, a desalinate output, and store energy 1102 in a first half-cycle. In the second half-cycle, the electrochemical battery is charged to generate a saline output and a desalinated output 1104. In certain embodiments, the energy used to perform the charge cycle may come from a renewable resource such as solar or wind power. The flow battery may be operated with either a single redox active species circulated around the anode and the cathode undergoing faradaic reactions at both electrodes or with two redox active species, one at each electrode.

The method of FIG. 11 is further described below. In a discharge half-cycle, an electrochemical desalination battery unit is provided. The battery unit comprises at least one pair of water reservoirs, where each comprises an input and an output. Water (e.g., seawater having a salinity of about 35 ppt) is input to the two water reservoirs. During the discharge mode, water in the first reservoir decreases in salinity below a threshold concentration (e.g., about 10 ppt, or in other embodiments about 0.5 ppt), and water in the second reservoir increases in salinity (e.g., to about 60 ppt). At least one anode comprises a first solution of a first electrolyte material and is configured to accept, and have, a reversible redox reaction with at least one redox-active ion in the water of the first reservoir, and at least one cathode comprises a second solution of a second electrolyte material and is configured to accept, and have, a reversible redox reaction with at least one redox-active ion in the water of the second reservoir. The pair of water reservoirs is separated by a first type of exchange membrane (e.g., AEM). A second type of exchange membrane, different from the first (e.g., CEM), is disposed between the at least one anode and the first water reservoir and also disposed between the at least one cathode and the second water reservoir. During discharge, water to be treated (e.g., seawater) is transported into/through the first and second water reservoirs. The desalinated water from the first water reservoir is saved, for example, in a holding tank while the salinated water generated in the second reservoir is removed/discharged from the system. Alternatively, the salinate stream could be saved, e.g., in another holding tank, for further treatment or use. Electricity is also generated and stored to a power grid. The desalinated water may then optionally be fed into one, or more, additional electrochemical desalination battery units having a similar design and/or one or more additional desalination systems, which use a water treatment process other than an electrochemical battery. The additional desalination batteries and/or desalination systems may be provided in series, in any order and combination. The water output from the system may be potable, having a salinity of, for example, equal to or less than 0.5 parts per thousand.

Before the other half-cycle is performed, here a charge half-cycle, the contents of the first pair of water reservoirs is replaced with new water to be treated (e.g., new seawater). During the charge cycle, the salinity of the second water reservoir decreases and the salinity of the first water reservoir increases (the reservoirs change roles during opposing half-cycles). Therefore, it is necessary to alternately collect water passing through the respective water reservoirs. For example, during the charge mode, the desalinated water is collected and stored from the second water reservoir and the salinate stream output from the first reservoir is discharged. During charge, discharge, and electrodialysis modes, the desalination battery produces desalinated water.

Since the desalination battery is capable of both energy storage and desalination, and the process for desalination is coupled to energy storage, the charging, discharging, and/or idling of the battery can be performed at different rates and durations. This variation can increase, or maximize, the amount of electrical energy stored and delivered, the salination and/or desalination water flux, and/or the total system revenue. This versatility in utilization is not achievable with systems that are only capable of one of desalination or energy storage.

Figure 12:
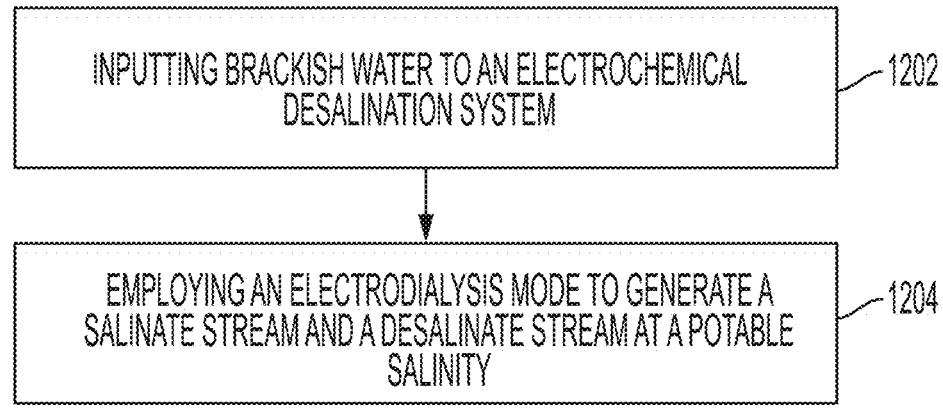

When the system above involves a single redox active species and is not charging or discharging, it may be operated in a third, electrodialysis mode to generate a saline output and a desalinated output as shown in FIG. 12. For example, the system may receive brackish water at an intermediate salinity (e.g., about 10 ppt) as an input to the cell 1202. Operating the cell as described in connection with FIGS. 1A-B provides an output of at least one salinate stream at a salinity above that of the input water and at least one desalinate stream at a salinity less than the input water such as potable water (e.g., water having TDS equal to or less than 0.5 ppt) 1204.

Figure 13:
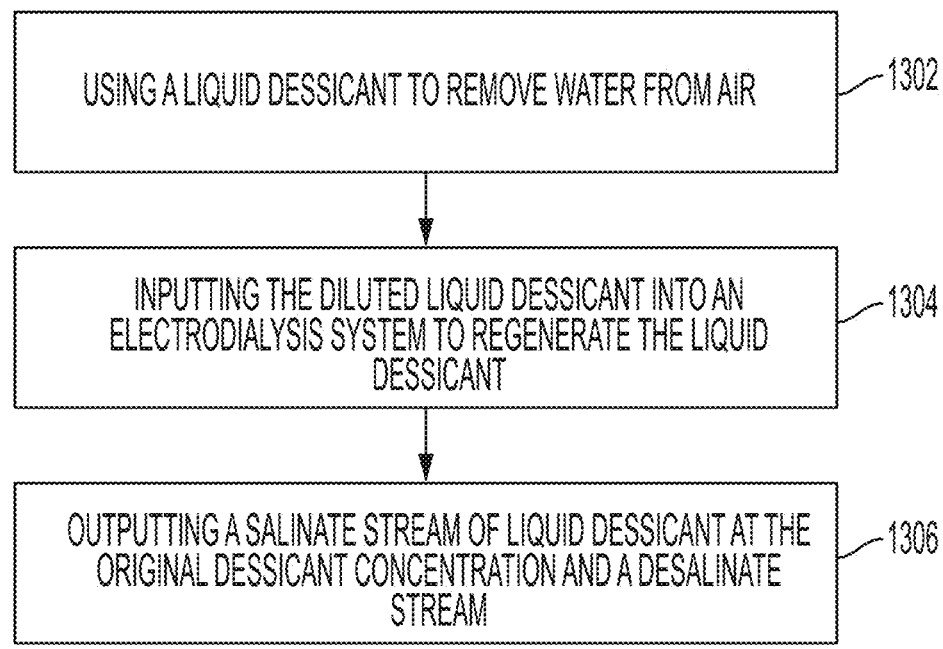

Further embodiments utilizing the system described above in connection with FIGS. 11 and 12 are directed to HVAC applications, such as dehumidification for air conditioning, and are further described in FIG. 13. Before being input to the desalination system, a liquid desiccant is used to remove water (e.g., water vapor) from air 1302. The diluted liquid desiccant is input to a system, as described above and including a four-chambered desalination cell 1304. Treating the input liquid desiccant (e.g., instead of seawater) generates a salinate stream of regenerated liquid desiccant (e.g., at or near the concentration used in the dehumidification process) and a desalinate stream 1306. The system may be used in this manner in various embodiments that involve nonaqueous solutions for separation into salinate and desalinate streams.

In certain embodiments, the hybrid desalination battery may be used to desalinate seawater or brines from saline aquifers. In other embodiments, the battery may be used to desalinate a large variety of industrial waste streams or geothermal brines, which can be at different pH values and/or contain various amounts of non-aqueous solvents. In further embodiments, the battery can be used to selectively remove/add ions to one of the water reservoirs while preserving one or more properties of that electrolyte such as pH, total suspended solids, and electrical conductivity. Notably, the hybrid desalination battery may be operated at a pH similar to that of the incoming feed (e.g., sea/salt water), to reduce or minimize a need for pH adjustment. Also, as discussed above, in other embodiments, one chamber (e.g., the anolyte) may have a slightly lower pH than the other chambers.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system for separating solvent from a salt dissolved in the solvent, comprising:
    an electrodialysis stack comprising one or more electrodialysis apparatuses, wherein the one or more electrodialysis apparatuses comprise a first electrodialysis apparatus and a second electrodialysis apparatus each electrodialysis apparatus comprising:
    a first reservoir comprising a first input and a first output, wherein the salt dissolved in the solvent in the first reservoir is reduced below a threshold concentration during an operation mode;

a second reservoir comprising a second input and a second output, wherein the salt dissolved in the solvent in the second reservoir increases in concentration during the operation mode;

a first electrode contacting a first aqueous solution of a first redox-active electrolyte material and configured to have a first reversible redox reaction with the first redox-active electrolyte material, and the first redox-active electrolyte material accepts a salt ion of the salt from the solvent in the first reservoir;

a second electrode contacting a second aqueous solution of a second redox-active electrolyte material and configured to have a second reversible redox reaction with the second redox-active electrolyte material, and drive a salt ion of the salt from the second redox-active electrolyte material into the solvent in the second reservoir, wherein at least one of the first and second redox-active electrolyte materials comprises a ferrocene derivative that is chemically stable in oxidized and reduced forms to reaction with oxygen gas;

a first type of membrane disposed between the first and second reservoirs;

a second type of membrane, different from the first type, disposed between the first electrode and the first reservoir and disposed between the second electrode and the second reservoir;

further comprising a switching unit coupled to the first and second outputs of the first and second reservoirs of the first electrodialysis apparatus, and the second electrodialysis apparatus is coupled to at least one output of the switching unit; and further comprising a second switching unit coupled to the first and second outputs of the first and second reservoirs of the second electrodialysis apparatus, and a desalination system coupled to at least one output of the second switching unit, wherein the desalination system uses a solvent treatment process different from the second electrodialysis apparatus.

2. The system of claim 1, wherein, within each electrodialysis apparatus, the first solution and the second solution are the same and the first and second solutions are circulated between the first electrode and the second electrode during the operation mode.

3. The system of claim 1, further comprising a desalination system coupled to the first output of the first reservoir of the second electrodialysis apparatus, wherein the desalination system uses a solvent treatment process different from the second electrodialysis apparatus.

4. The system of claim 1, wherein the first output of the first reservoir of the first electrodialysis apparatus is connected to the first input of the first reservoir of the second electrodialysis apparatus via the switching unit.

5. The system of claim 1, wherein the one or more electrodialysis apparatuses comprise a first electrodialysis apparatus and a second electrodialysis apparatus, and wherein either the first or second electrode of the first electrodialysis apparatus is in electrical contact with one face of an electrically conducting electrode plate.

6. The system of claim 5, wherein the electrode plate is additionally, through an opposite face, in electrical contact with either the first or second solution of the second electrodialysis apparatus.

7. The system of claim 1, wherein a pH of first and second salt solutions in the respective first and second reservoirs is between 3 and 9, and wherein the first and second aqueous solutions are pH-matched to the respective first and second salt solutions using a pH buffer.

* * * * *